US012810736B2

(12) United States Patent
Jenkins et al.

(10) Patent No.: US 12,810,736 B2
(45) Date of Patent: Nov. 24, 2026

(54) CONTINGENCY RESPONSE OPERATIONS FOR FLIGHT PATHS

(71) Applicant: Wing Aviation LLC, Palo Alto, CA (US)

(72) Inventors: Kevin Jenkins, Dallas, TX (US); John Gordon Mooney, Athens, GA (US); Aditya Undurti, Dublin, CA (US); Brandon Lane Jones, Palo Alto, CA (US)

(73) Assignee: Wing Aviation LLC, Palo Alto, CA (US)

(*) Notice: Subject to any disclaimer, the term of this patent is extended or adjusted under 35 U.S.C. 154(b) by 211 days.

(21) Appl. No.: 18/757,835

(22) Filed: Jun. 28, 2024

(65) Prior Publication Data

US 2026/0057788 A1 Feb. 26, 2026

(51) Int. Cl.

| | |
|---|---|
| ***G08G 5/00*** | (2025.01) |
| ***G05D 1/644*** | (2024.01) |
| ***G05D 1/656*** | (2024.01) |
| ***G08G 5/34*** | (2025.01) |
| *G05D 109/25* | (2024.01) |

(52) U.S. Cl.

CPC ............... *G08G 5/34* (2025.01); *G05D 1/644* (2024.01); *G05D 1/665* (2024.01); *G05D 2109/25* (2024.01)

(58) Field of Classification Search

CPC .............. G08G 5/34; G08G 5/21; G08G 5/26; G08G 5/54; G08G 5/55; G08G 5/57; G08G 5/76; G08G 5/00; G05D 1/644; G05D 1/665; G05D 2109/25

USPC ............................................................... 701/3

See application file for complete search history.

(56) References Cited

U.S. PATENT DOCUMENTS

| | | | | |
|---|---|---|---|---|
| 7,512,462 | B2 | 3/2009 | Nichols et al. | |
| 9,257,048 | B1 | 2/2016 | Offer et al. | |
| 9,274,529 | B2 | 3/2016 | Ben-Shachar et al. | |
| 10,068,489 | B2 | 9/2018 | Brown et al. | |
| 10,551,205 | B2 | 2/2020 | Gaspard-Boulinc et al. | |
| 10,571,287 | B2 | 2/2020 | Moore et al. | |
| 11,029,168 | B2 | 6/2021 | Stroman et al. | |
| 11,302,203 | B2 | 4/2022 | Sasaki | |
| 11,592,824 | B2 | 2/2023 | Gu et al. | |
| 2017/0069214 | A1* | 3/2017 | Dupray | G08G 5/56 |

(Continued)

FOREIGN PATENT DOCUMENTS

CN 109747427 B 2/2021

*Primary Examiner* — Shardul D Patel

(74) *Attorney, Agent, or Firm* — McDonnell Boehnen Hulbert & Berghoff LLP

(57) ABSTRACT

A method includes determining a portion of a flight path of an aerial vehicle. The method also includes determining an attribute value representing an operating condition expected to be experienced by the aerial vehicle at the portion of the flight path. The method additionally includes determining, based on the attribute value and using a non-linear model, a power value representing an amount of power expected to be consumed by the aerial vehicle in connection with the portion of the flight path. The method further includes determining, based on the power value, an energy value representing an amount of energy expected to be consumed by the aerial vehicle in connection with the portion of the flight path. The method yet further includes determining the flight path based on the energy value.

20 Claims, 15 Drawing Sheets

(56) References Cited

U.S. PATENT DOCUMENTS

| | | | | |
|---|---|---|---|---|
| 2020/0277080 | A1* | 9/2020 | Wiegman | B60L 50/60 |
| 2021/0407303 | A1 | 12/2021 | Yogesha et al. | |
| 2023/0419741 | A1 | 12/2023 | Jemison et al. | |

* cited by examiner

CONTINGENCY RESPONSE OPERATIONS FOR FLIGHT PATHS

BACKGROUND

Aerial vehicles may follow various flight paths. Energy may be consumed by an aerial vehicle as the aerial vehicle flies along portions of the flight path. To facilitate planning and execution of the flight paths, it may be beneficial to predict the energy consumption of the aerial vehicle along the flight path. Additionally, it may be beneficial to adjust operation of the aerial vehicle when the actual energy consumption along the flight path differs from the predicted energy consumption for the flight path.

SUMMARY

An aerial vehicle may follow flight paths. It may be beneficial to predict the power and/or energy consumption of the aerial vehicle along the flight path to, for example, plan the flight path such that that the aerial vehicle is capable of completing the flight path. The power and/or energy consumption of the aerial vehicle may be predicted using one or more models (e.g., machine learning models) based on attribute values representing operating conditions along the flight path. The one or more models may be configured to generate predictions for a fleet of aerial vehicles, a specific aerial vehicle type, a specific aerial vehicle, or any combination thereof. A power model may determine an expected power consumption of the aerial vehicle along different portions of the flight path, and the expected power consumption may be used to determine an expected energy consumption. The flight path may be planned and/or modified based on the expected power consumption and/or the expected energy consumption of the aerial vehicle.

It may also be beneficial to detect when the aerial vehicle is likely to use more energy for traversing the flight path than has been allocated therefor, and adjust operation of the aerial vehicle accordingly. Specifically, the expected energy consumption of the aerial vehicle may be used to determine an energy allocation for the flight path. The energy allocation may include a baseline energy value representing the expected energy consumption and an energy margin value representing room for error beyond the baseline energy value. An actual energy consumption for the flight path may be measured and compared against the energy allocation. A contingency responses operation may be executed when the actual energy consumption indicates that the energy allocation is likely to be exceeded before completion of the flight path, thus protecting the vehicle from potential adverse effects of experiencing an energy shortfall mid-flight. The contingency response operation may include reducing the length of the flight path, eliminating parts of the flight path, redirecting the aerial vehicle to a safe location, and/or other actions that may reduce the energy consumption of the aerial vehicle.

In a first example embodiment, a method includes determining a portion of a flight path of an aerial vehicle. The method also includes determining an attribute value representing an operating condition expected to be experienced by the aerial vehicle at the portion of the flight path. The method additionally includes determining, based on the attribute value and using a non-linear model, a power value representing an amount of power expected to be consumed by the aerial vehicle in connection with the portion of the flight path. The method further includes determining, based on the power value, an energy value representing an amount of energy expected to be consumed by the aerial vehicle in connection with the portion of the flight path. The method yet further includes determining the flight path based on the energy value.

In a second example embodiment, a method may include determining a flight path of an aerial vehicle. The method may also include determining a section energy allocation for a section of the flight path. The section energy allocation may include (i) a section baseline energy value representing a first amount of energy expected to be consumed by the aerial vehicle in connection with traversing the section of the flight path and (ii) a section energy margin value representing a second amount of energy by which the aerial vehicle is permitted to exceed the first amount of energy in traversing the section of the flight path. The method may additionally include determining a section energy expenditure of the aerial vehicle observed in connection with traversing the section of the flight path by the aerial vehicle. The method may further include determining that the section energy expenditure exceeds the section energy allocation and, based on determining that the section energy expenditure exceeds the section energy allocation, causing the aerial vehicle to perform a contingency response operation.

In a third example embodiment, a non-transitory computer-readable storage medium may have stored thereon instructions that, when executed by a computing system, cause the computing system to perform operations in accordance with the first example embodiment and/or the second example embodiment.

In a fourth example embodiment, a system may include a processor and a non-transitory computer-readable storage medium may have stored thereon instructions that, when executed by the processor, cause the processor to perform operations in accordance with the first example embodiment and/or the second example embodiment.

In a fifth example embodiment, a system may be configured to perform operations in accordance with the first example embodiment and/or the second example embodiment.

In a sixth example embodiment, a system may include various means for performing operations in accordance with the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
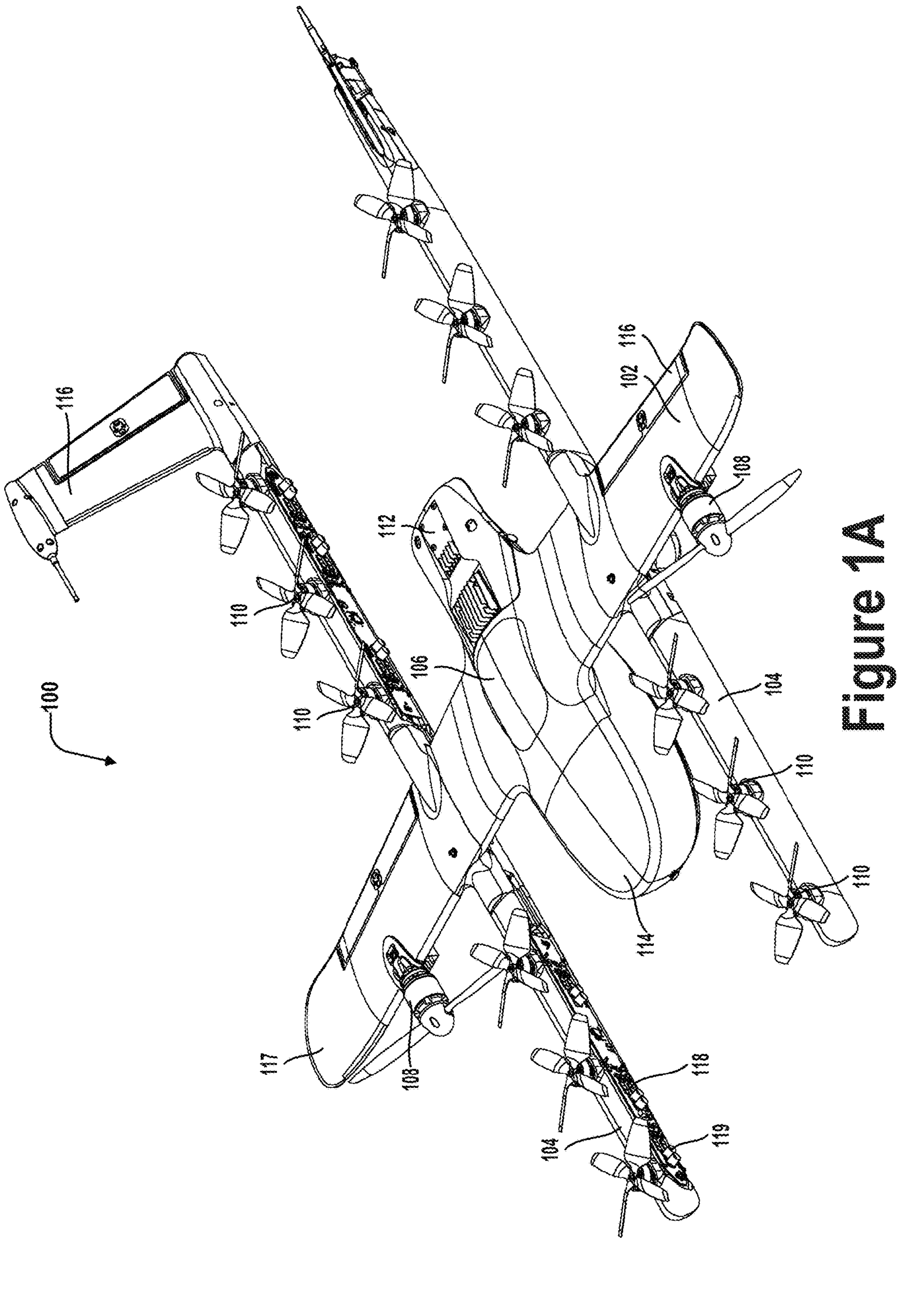
FIG. 1A illustrates an uncrewed aerial vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

An aerial vehicle may be configured to traverse a flight path. The flight path may include a starting location, one or more intermediate locations, and a destination location, and may represent at least part of a mission or task assigned to the aerial vehicle. In order to increase the likelihood of the aerial vehicle being able to successfully traverse the flight path, it may be beneficial to determine an expected power consumption and/or an expected energy consumption of the aerial vehicle in connection with traversing the flight path and/or portions thereof. Thus, the aerial vehicle may be used in connection with an energy system configured to estimate future power and/or energy consumption of the aerial vehicle. The energy system may include a power model configured to generate a power value representing a predicted power usage of the aerial vehicle in connection with a portion of the flight path (e.g., a section of the flight path and/or a point along the section of the flight path), and an energy model configured to generate an energy value representing a predicted energy usage of the aerial vehicle in connection with the portion of the flight path. For example, the energy model may be configured to determine the energy value by integrating one or more power values generated by the power model.

The power model may be configured to generate the power value based on attribute value(s) that represent operating condition(s) expected to be present in connection with the portion of the flight path. The operating condition(s) may include characteristics/properties/attributes of the aerial vehicle itself, the planned and/or expected motion and/or behavior of the aerial vehicle while traversing the flight path, and/or characteristics of the environment along and/or around the flight path, among others. Thus, the attribute value(s) may provide numerical representations of various circumstances that may and/or are likely to affect the aerial vehicle's power and/or energy consumption when traversing the flight path. The power model may be non-linear, and may thus be configured to represent and/or account for complex relationships between the attribute value(s) and power usage. For example, the power model may include one or more artificial neural networks.

In some implementations, the power model may include a plurality of models, each of which may be applicable to a fleet of aerial vehicles, a specific type of aerial vehicle, a specific aerial vehicle, or a combination thereof. For example, the power model may include a fleet-wide model, a vehicle-type-specific model, and a vehicle-specific model. The fleet-wide model may have been trained using training samples obtained from a plurality of different types of aerial vehicles in an aerial vehicle fleet, and may thus be configured to generate power values for any vehicle type in the fleet. The vehicle-type-specific model may have been trained using training samples obtained from vehicles of a corresponding type of the plurality of different types of aerial vehicles in the fleet, and may thus be configured to generate power values for any vehicle of the corresponding type. The vehicle-specific model may have been trained using training samples obtained from a particular vehicle in the fleet, and may thus be configured to generate power values for the particular vehicle.

These plurality of models of the power model may vary in size, amount of training data used for training, computational resource usage involved in execution, and/or accuracy of outputs for a given vehicle, among other factors. Thus, the plurality of models may be used individually or in combination, depending on the circumstances, to achieve a target balance of two or more of these factors.

For example, a power value for the portion of the flight path may be generated using the plurality of models of the power model. Specifically, the fleet-wide model may be used to generate an initial power value for the portion of the flight path, possibly based on all of the attribute value(s) available for the portion of the flight path. The vehicle-type-specific model may be used to generate an intermediate power value based on the initial power value. The intermediate power value may represent a refinement and/or correction of the initial power value to account for how power usage of the corresponding vehicle type differs from fleet-wide power usage and, in some cases, may be based on a first proper subset of the attribute value(s) available for the portion of the flight path. The vehicle-specific model may be used to generate a final power value based on the intermediate power value. The final power value may represent a refinement and/or correction of the intermediate power value to account for how power usage of the specific vehicle differs from that of other vehicles of the same type (e.g., to account for vehicle-specific quirks, nuances, and/or variations) and, in some cases, may be based on a second proper subset of the attribute value(s) available for the portion of the flight path.

The flight path may be determined and/or modified based on the power and/or energy expenditures determined for different portions of the flight path. For example, the flight path may be determined and/or modified to reduce and/or minimize power and/or energy consumption (e.g., per unit distance) along the flight path. The determination and/or modification of the flight path may be performed before the aerial vehicle starts traveling along the flight path and/or after the aerial vehicle has traveled along part of the flight path. Thus, the energy model may allow the aerial vehicle to traverse longer flight paths and/or execute more tasks per flight path by, for example, avoiding flight path sections that are expected to consume large amounts of power and/or energy.

The aerial vehicle may also be used in connection with a contingency system. The contingency system may be configured to adjust operation of the aerial vehicle when, for example, the contingency system determines that the aerial vehicle is expected and/or likely to use more energy than has been allocated for the flight path. Specifically, the contingency system may be configured to determine a contingency response operation that allows the aerial vehicle to perform at least part of a mission associated with the flight path while accounting for any potential energy shortfall. In some cases, determination of the contingency response operation may involve using the energy system to determine expected power and/or energy usage along potential contingency flight path sections.

For example, the contingency system may be configured to determine a total energy allocation for the flight path. The total energy allocation may include a plurality of section energy allocations corresponding to a plurality of flight path sections of the flight path. Each respective section energy allocation may include (i) a section baseline energy allocation that indicates an amount of energy that the aerial vehicle is planned and/or expected to use in connection with traversing a corresponding flight path section and (ii) a section energy margin that indicates surplus energy allotted to the corresponding flight path section to provide some room for error in determination of the section baseline energy allocation and/or execution of the corresponding flight path section. A total baseline energy allocation for the flight path may be based on a sum of the section baseline energy allocations for the plurality of flight path sections thereof, and a total energy margin for the flight path may be based on a sum of the section energy margins for the plurality of flight path sections thereof.

As the aerial vehicle traverses sections of the flight path, the contingency system may monitor an energy expenditure of the aerial vehicle in connection with completed sections of the flight path. The contingency system may use a section energy expenditure of one or more completed flight path sections to determine whether to cause the aerial vehicle to execute the contingency response operation. For example, the contingency system may use a section energy expenditure of the one or more completed flight path sections to determine a projected total energy expenditure for the flight path. Specifically, the section energy expenditure may be scaled according to the fraction of the flight path represented by the one or more completed flight path sections, thus projecting the actual energy consumption of the aerial vehicle to the flight path as a whole (including any sections thereof that have not yet been flown). When the projected total energy expenditure exceeds the total energy allocation for the flight path, the contingency system may be configured to generate the contingency response operation to reduce and/or avoid an energy shortfall in the aerial vehicle.

In some cases, the contingency system may be additionally or alternatively configured to determine whether a section energy expenditure observed in connection with a section of the flight path exceeds a section energy allocation for the flight path section. The contingency system may be configured to determine the contingency response operation based on and/or in response to determining that, for the flight path section, the section energy expenditure exceeds the section energy allocation (including both the baseline section energy allocation and the section energy margin). Thus, the contingency system may determine that excess energy usage during a single completed flight path section is a sufficient indicator of an energy shortfall along the flight path as a whole to warrant execution of the contingency response operation.

Additionally or alternatively, the contingency system may be configured to determine the contingency response operation based on and/or in response to determining that, for at least a threshold number of completed flight path sections, the collective and/or individual section energy expenditure exceeds the collective and/or individual section energy allocation. Thus, the contingency system may determine that excess energy usage during at least the threshold number of completed flight path sections is a sufficient indicator of an energy shortfall along the flight path as a whole to warrant execution of a contingency response operation.

The contingency response operation may involve adjusting one or more locations along the flight path (e.g., changing the destination location), shortening the flight path and/or sections thereof, rerouting the aerial vehicle through more energy-efficient airspace (e.g., airspace associated with operating conditions expected to cause lower energy usage), and/or reallocating energy along flight path sections, among other possibilities. As one example, the contingency response operation may involve increasing an altitude from which the aerial vehicle performs a payload pick-up and/or payload drop-off, thus allowing the aerial vehicle to use less energy to descend and/or ascend on the flight path. As another example, the contingency response operation may involve changing (e.g., lowering) an airspeed with which the aerial vehicle traverses the flight path, thus allowing the aerial vehicle to traverse the flight path at a more energy-efficient speed.

II. Example Uncrewed Vehicles

Herein, the terms "unmanned aerial system," "uncrewed aerial system," and/or "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), "unmanned aerial vehicle," or "uncrewed aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
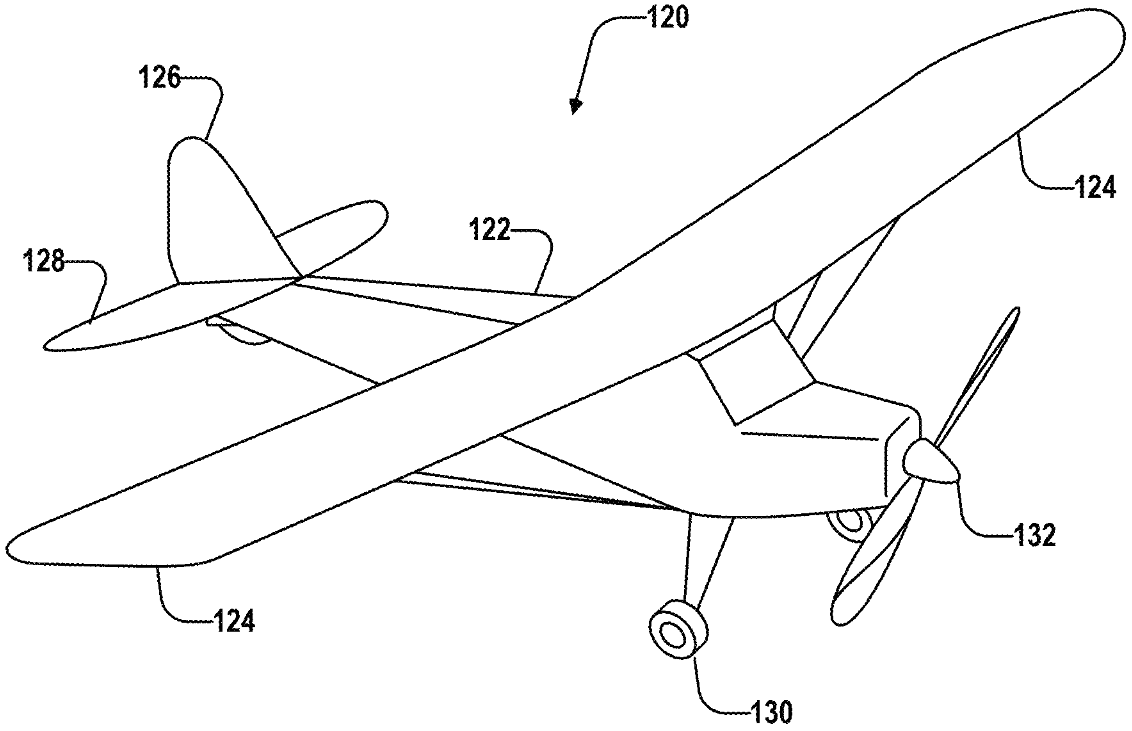
FIG. 1B illustrates an uncrewed aerial vehicle, in accordance with examples described herein.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
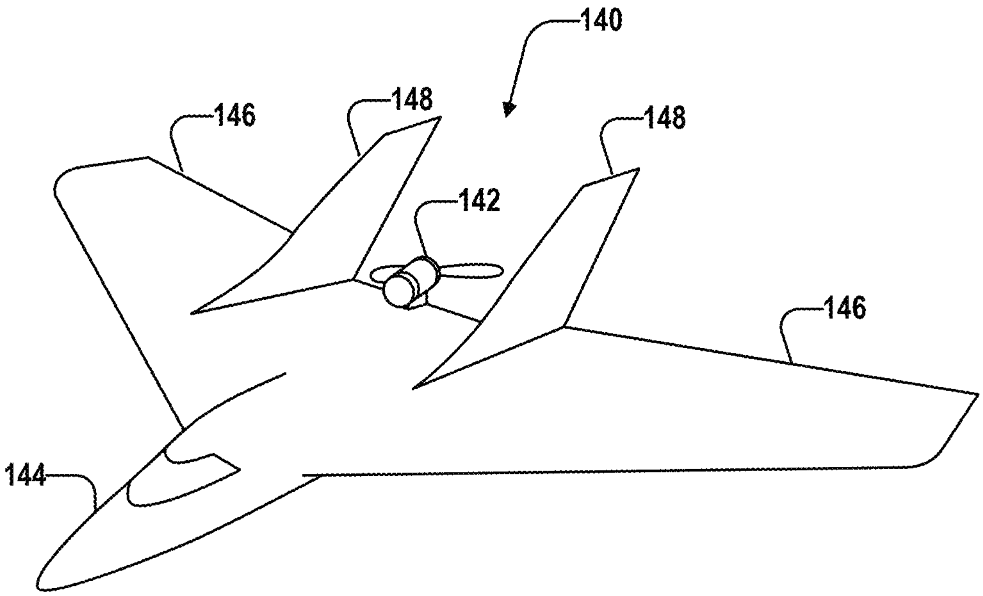
FIG. 1C illustrates an uncrewed aerial vehicle, in accordance with examples described herein.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
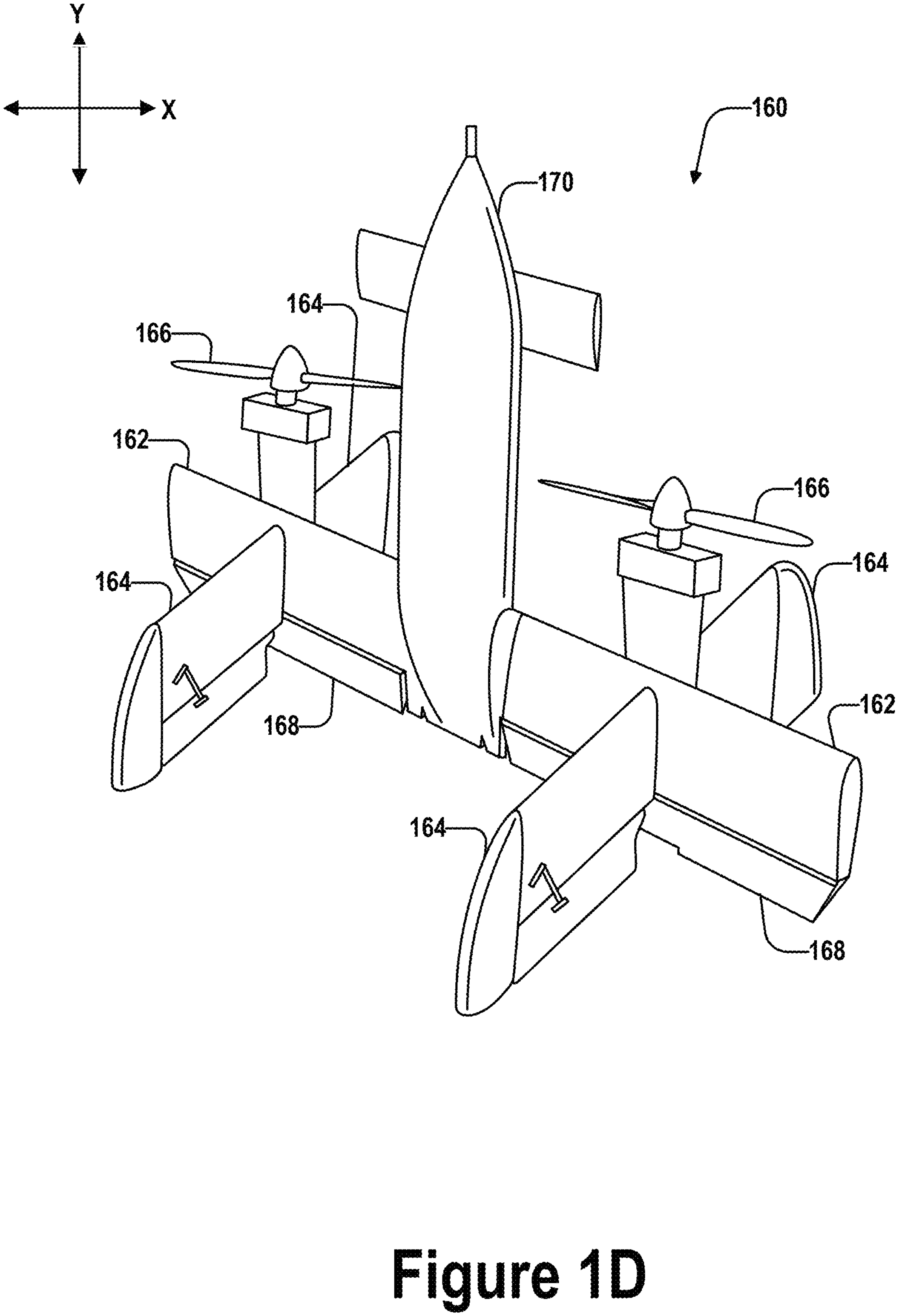
FIG. 1D illustrates an uncrewed aerial vehicle, in accordance with examples described herein.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
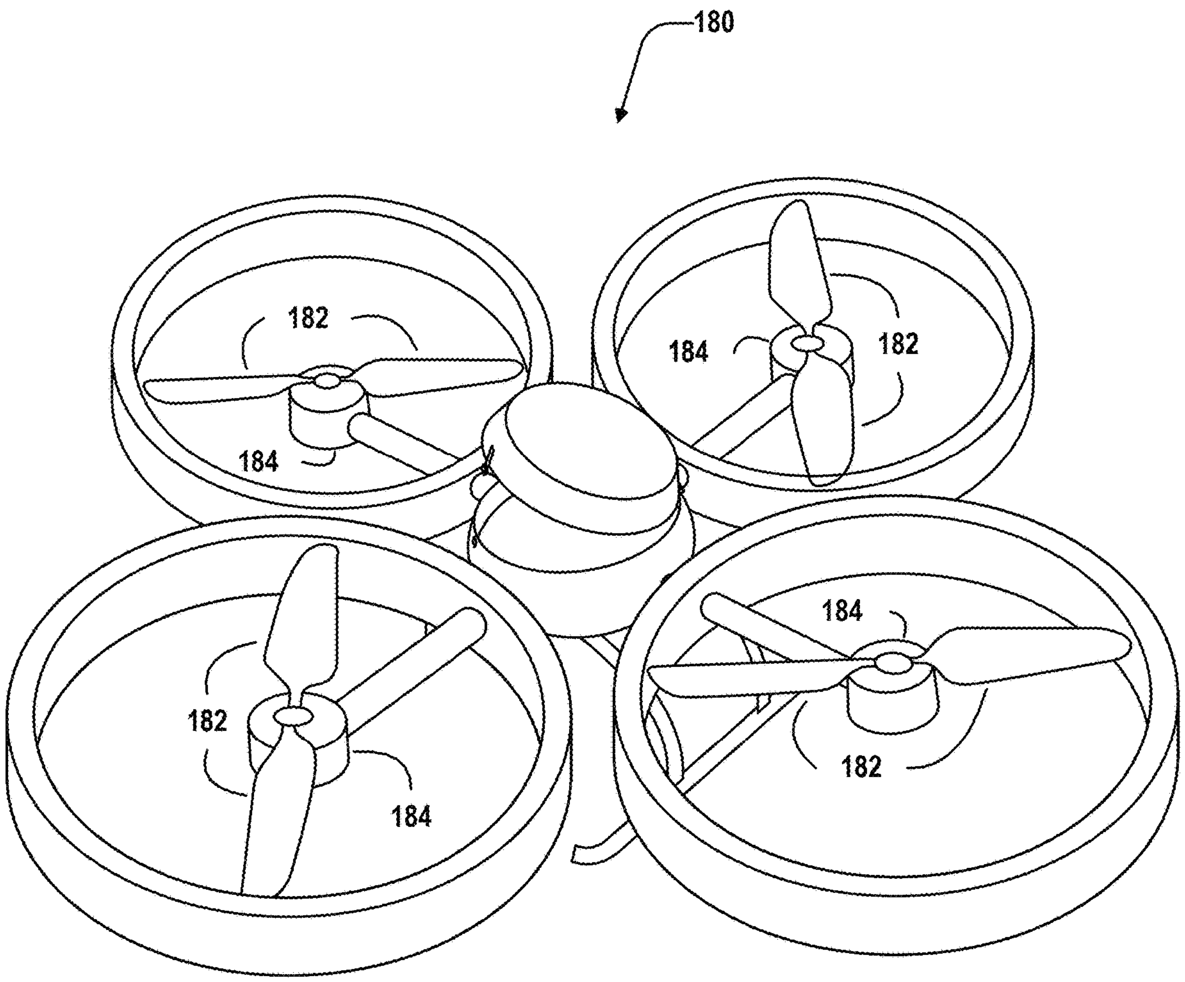
FIG. 1E illustrates an uncrewed aerial vehicle, in accordance with examples described herein.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Example UAV Components

Figure 2:
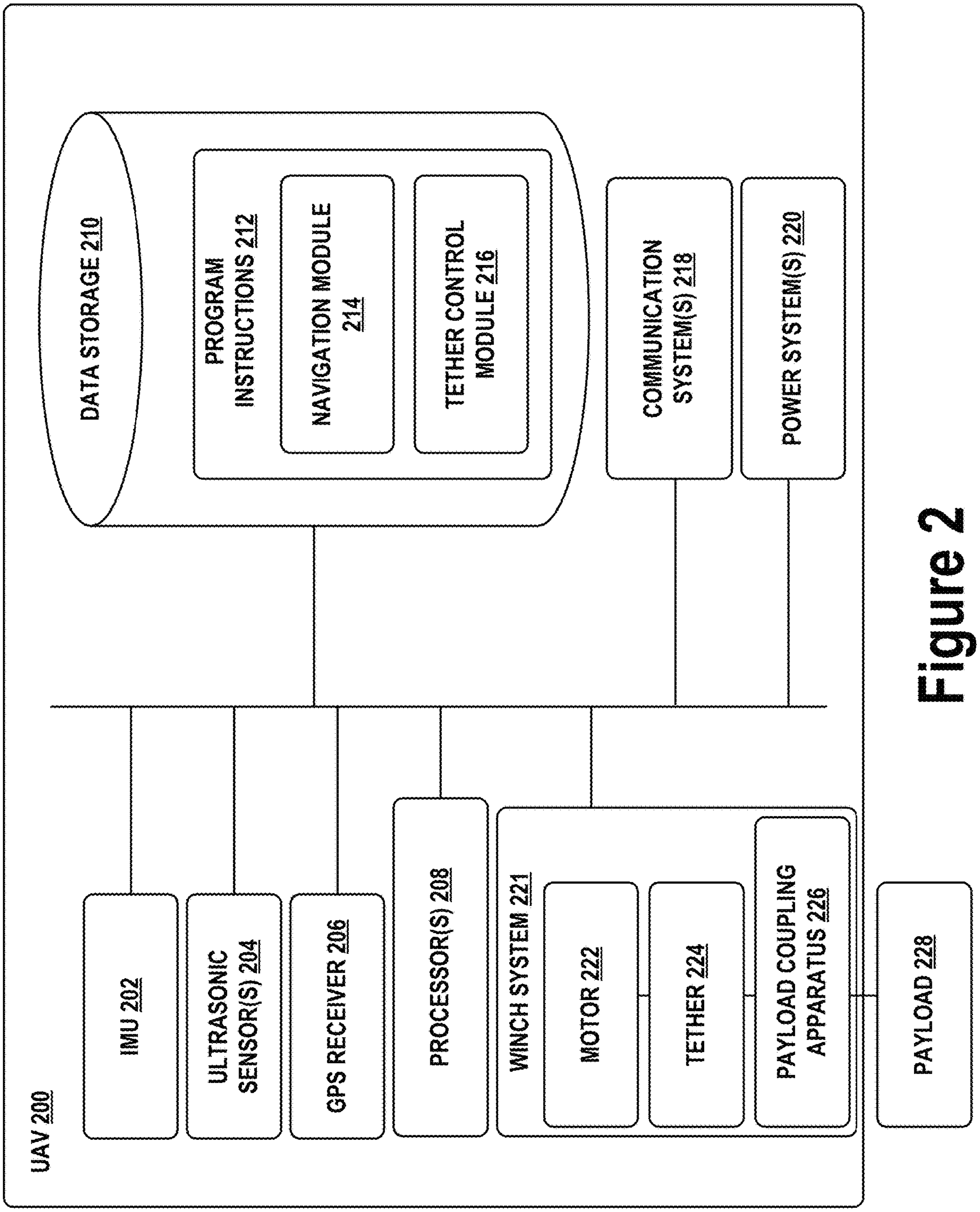
FIG. 2 illustrates components of an uncrewed aerial system, in accordance with examples described herein.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. Example UAV Deployment Systems

Figure 3:
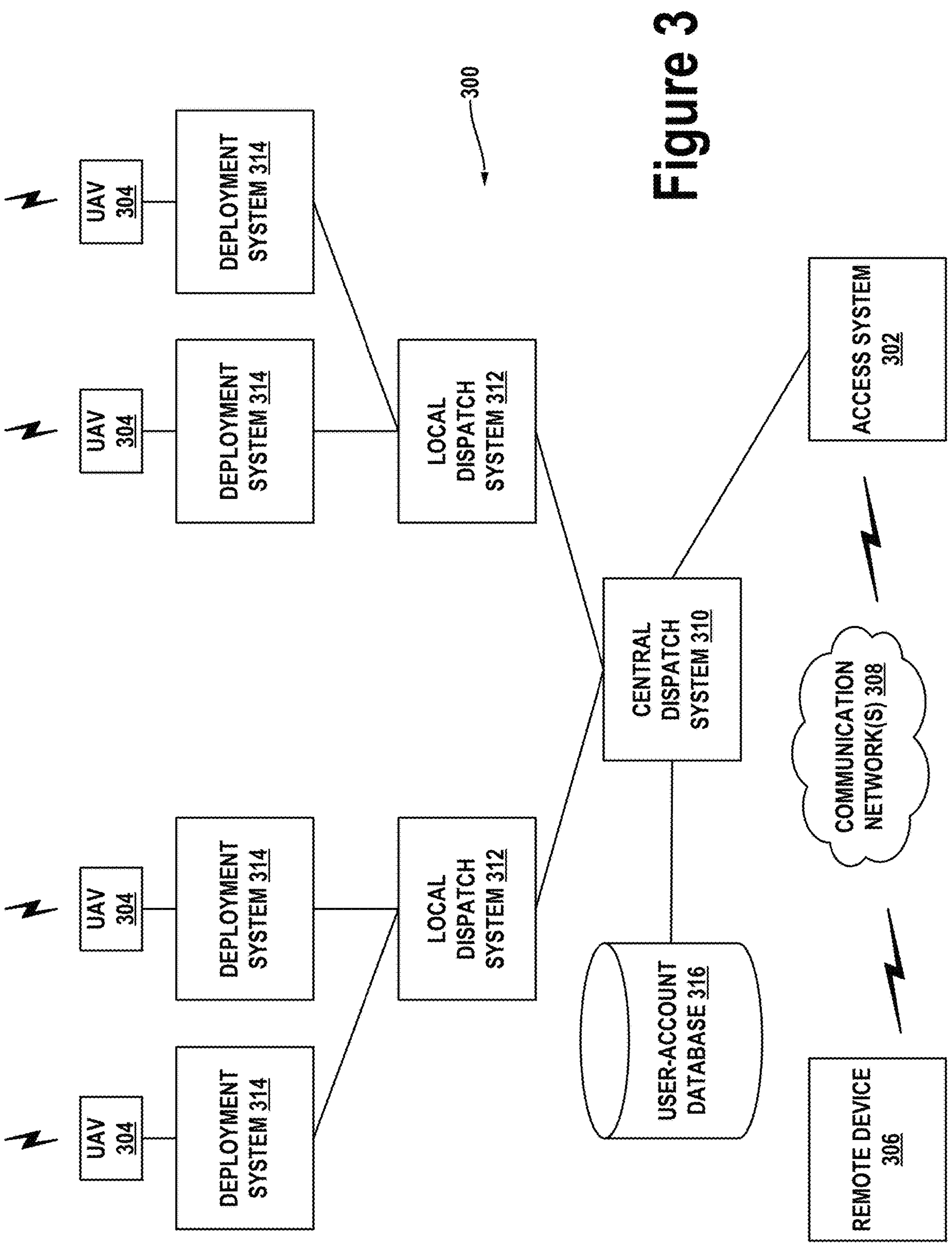
FIG. 3 is a block diagram illustrating a distributed UAV system, in accordance with examples described herein.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Deployment system 314 could also include other structures and/or systems to assist and/or facilitate UAV landing processes.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

V. Example Energy System

Figure 4:
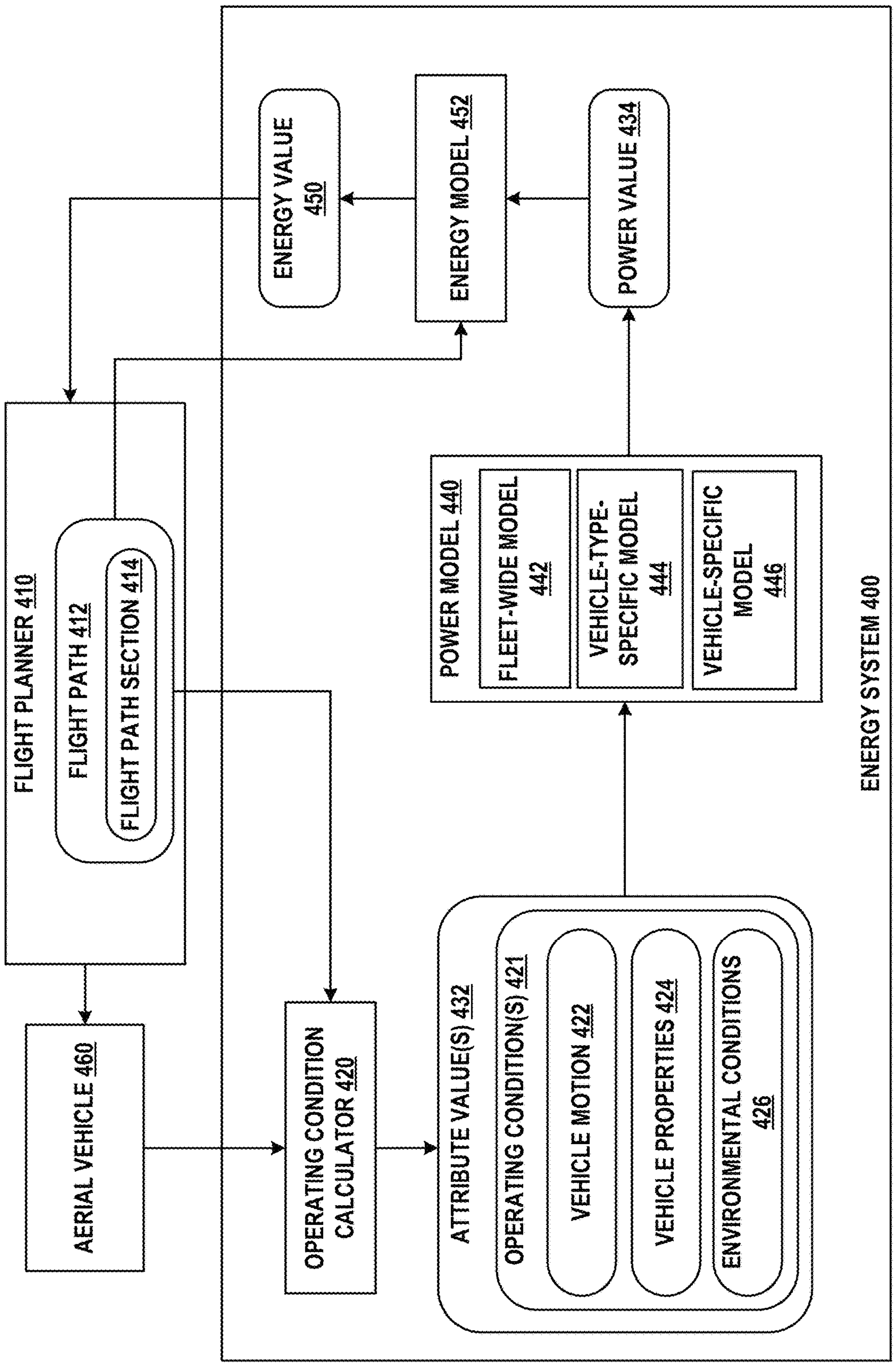
FIG. 4 illustrates an energy system, in accordance with examples described herein.

FIG. 4 illustrates an example energy system 400. Energy system 400 may be simplified by the removal of any one or more of the features shown therein. Energy system 400 may be combined with features, aspects, and/or implementations of any of the figures and/or examples described herein. Energy system 400 may include operating condition calculator 420, power model 440, and energy model 452. Energy system 400 may be used in connection with flight planner 410 and aerial vehicle 460. Energy system 400 may alternatively be referred to as an energy consumption prediction system. Aerial vehicle 460 may represent UAV 100, 120, 140, 160, 180, and/or 200. Energy system 400 may be implemented using hardware, software, or a combination thereof.

Flight planner 410 may be configured to determine, plan, store, and/or modify aspects of flight path 412. Flight planner 410 may be configured to provide flight path 412 to aerial vehicle 460 and/or cause aerial vehicle 460 to follow flight path 412. Flight planner 410 and/or energy system 400 may be a part of aerial vehicle 460, central dispatch system 310, and/or local dispatch system 312, among other possibilities. Flight planner 410 may also be configured to plan the flight paths for a plurality of other aerial vehicles.

Flight path 412 may include a starting location and a destination location. In some cases, the starting location and destination location may be the same location (i.e., flight path 412 may represent a round-trip). Flight path 412 may include at least one flight path section 414. For example, flight path 412 may be formed by a plurality of flight path sections 414. Flight planner 410 may determine flight path 412 by creating a plurality of flight path sections 414, and linking the plurality of flight path sections 414 together. A flight path section that is being considered and/or evaluated for addition to flight path 412, but that has not yet been added to flight path 412, may be considered and/or referred to as a candidate flight path section. A flight path that is being considered and/or evaluated for assignment to aerial vehicle 460, but that has not yet been assigned to aerial vehicle 460, may be considered and/or referred to as a candidate flight path.

In some cases, the plurality of flight path sections 414 may be contiguous and mutually exclusive (e.g., the end of a given flight path section may be the start of a subsequent flight path section). In other cases, the plurality of flight path sections 414 may overlap with one another (e.g., the end of a given flight path section may be after the start of a subsequent flight path section). In some cases, flight path section 414 may span an entirety of flight path 412 (e.g., when flight path 412 includes one flight path section 414). Flight path 412 may also include one or more intermediate locations between the starting location and destination location. Flight path section 414 may extend from the starting location to the destination location, from the starting location to the intermediate location, from the intermediate location to another intermediate location, and/or from the intermediate location to the destination location. In some cases, flight path 412 may include and/or represent a contingency response operation and/or contingency flight path section. The contingency response operation may be added to flight path 412 after aerial vehicle 460 starts flying along flight path 412.

Operating condition calculator 420 may be configured to determine attribute value(s) 432 corresponding to flight path section 414 (and/or portion(s) thereof). Attribute value(s) 432 may represent and/or be indicative of operating condition(s) 421 that aerial vehicle 460 is expected/predicted to experience and/or has experienced during flight path section 414. Operating condition(s) 421 may include vehicle motion 422, vehicle properties 424, and/or environmental conditions 426. Operating condition calculator 420 may be configured to determine operating condition(s) 421 using sensors, predictive models, and/or databases, among other possibilities. Attribute value(s) 432 may be represented using one or more of a scalar, a vector, a matrix, a binary value, and/or other type of data and/or data structures. In some cases, a plurality of attribute values 432 may be determined for a plurality of flight path sections 414 that form flight path 412 and/or a plurality of flight path portions of each flight path section 414. For example, attribute value(s) 432 may represent operating condition(s) 421 for a plurality of locations sampled along each flight path section 414.

Attribute value(s) 432 may represent operating condition(s) 421 that aerial vehicle 460 is expected to experience while traversing flight path section 414. Thus, attribute value(s) 432 may be determined before flight path section 414 is traversed by aerial vehicle 460. As one example, operating condition(s) 421 along flight path section 414 may be predicted based on and/or using historical flight data, data captured by other aerial vehicles operating at or near flight path section 414, and/or predictive models, among other possibilities. For example, a wind speed, an air temperature, and/or an air pressure that aerial vehicle 460 may experience during flight path section 414 may be predicted using meteorological models. Predicting attribute value(s) 432 may allow energy system 400 to consider the effects of operating condition(s) 421 on aerial vehicle 460 before aerial vehicle 460 initiates flight path 412 and/or flight path section 414, thus allowing flight planner 410 to adjust, improve, and/or optimize flight path section 414 and/or flight path 412.

As another example, some of operating condition(s) 421 may be planned, selected, and/or controlled by, for example, flight planner 410 and/or aerial vehicle 460. For example, flight planner 410 and/or aerial vehicle 460 may control how fast aerial vehicle 460 traverses flight path section 414 and/or whether aerial vehicle 460 is carrying a payload, among other possibilities.

Additionally or alternatively, attribute value(s) 432 may represent operating condition(s) 421 that aerial vehicle 460 has experienced while traversing flight path section 414. For example, operating condition(s) 421 may be measured (e.g., in real time) by sensor(s) on aerial vehicle 460 and/or sensors along flight path section 414. This may be beneficial as it may provide accurate information regarding condition(s) that have actually been experienced by aerial vehicle 460 along flight path section 414. For example, operating condition(s) 421 that may be measured using sensors include (i) a position of aerial vehicle 460 (e.g., measured using GPS or an inertial navigation system), (ii) a ground speed of aerial vehicle 460 (e.g., measured using a change in the position over time), (iii) an air speed of aerial vehicle 460 (e.g., measured using an airspeed indicator or an anemometer); (iv) a wind speed and/or wind direction at aerial vehicle 460 (e.g., measured using a difference between the ground speed and the air speed, (v) an air temperature at aerial vehicle 460 (e.g., measured using a thermometer), and/or (vi) and an air pressure at aerial vehicle 460 (e.g., measured using a barometer).

Vehicle motion 422 may represent factors related to the kinematics and/or dynamics of aerial vehicle 460 in connection with flight path section 414. Vehicle motion 422 may represent a position (e.g., latitude, longitude, and/or altitude), distance, displacement, speed, velocity, and/or acceleration of aerial vehicle 460, among other possibilities. Vehicle motion 422 may represent a measured motion of aerial vehicle 460 (e.g., a measured geolocation, measured speed, and/or measured acceleration of aerial vehicle 460) and/or a commanded motion of aerial vehicle 460 (e.g., a commanded geolocation, commanded speed, and/or commanded acceleration of aerial vehicle 460). The commanded motion of aerial vehicle 460 may represent the motion that aerial vehicle 460 is attempting to achieve.

The motion of aerial vehicle 460 may be measured relative to the ground and/or relative to the air mass (e.g., including wind) surrounding aerial vehicle 460. For example, the speed of aerial vehicle 460 relative to the air mass surrounding aerial vehicle 460 may be referred to as equivalent airspeed. The speed of aerial vehicle 460 relative to the ground may be referred to as ground speed or inertial speed. Vehicle motion 422 may represent motion along and/or about the forward-backward direction(s), the lateral direction(s), the vertical direction(s), or combinations thereof. Vehicle motion 422 may represent linear motion and/or rotational motion of aerial vehicle 460. For example, vehicle motion 422 may include an equivalent air speed, a forward commanded (air and/or ground) speed, a forward commanded (air and/or ground) acceleration, a vertical air speed, a vertical air acceleration, a vertical commanded air speed, a vertical commanded air acceleration, and/or a turning speed.

Vehicle properties 424 may represent one or more factors related to the properties of aerial vehicle 460 in connection with flight path section 414. Vehicle properties 424 may include physical properties of aerial vehicle 460, such as size, weight, shape (e.g., cross-sectional area), aerodynamics, available propulsion systems (e.g., whether or not the vehicle can glide, hover, etc.), characteristics of the propulsion systems, and/or type (e.g., model number) of aerial vehicle 460, among other possibilities. Vehicle properties 424 may also include variable properties of aerial vehicle 460 that may be adjusted based on flight path 412. The variable properties may include whether aerial vehicle 460 carries a package/payload (e.g., a binary value of 0 may indicate that aerial vehicle is not carrying a payload, while a binary value of 1 may indicate that aerial vehicle is carrying a payload), characteristics of the package/payload (such as size and/or weight of the package/payload), mechanical and/or software issues (e.g., inoperable or inefficient propulsion systems, stuck control surface, battery issues, and/or other unintended conditions of aerial vehicle 460), among other possibilities. The variable properties may also include one or more prior power and/or energy consumption values that indicate an amount of power and/or energy, respectively, consumed in one or more prior sections of flight path 412 that precede flight path section 414. The prior power and/or energy consumption values may be measured as aerial vehicle 460 is flown through the one or more prior sections.

Environmental conditions 426 may represent one or more factors related to the surroundings of aerial vehicle 460 along flight path section 414. Environmental conditions 426 may include the wind speed, wind direction, air pressure, air temperature, weather condition (e.g. sunny, overcast, cloudy, rain, hail, and/or snow), and/or the severity of the weather condition, among other possibilities. Environmental conditions 426 may be measured and/or predicted for one or more locations (e.g., latitude, longitude, and/or altitude) along flight path section 414, and/or one or more locations surrounding (e.g., within a threshold distance of) flight path section 414. In some cases, predicting environmental conditions 426 along flight path section 414 may be more accurate than predicting environmental conditions 426 at surrounding locations, possibly at the cost of increased computational effort.

Some of operating condition(s) 421 may thus depend on and/or vary as a function of the location of aerial vehicle 460 along flight path section 414 (e.g., weather, air pressure, etc.) and/or the heading/direction of aerial vehicle 460 along flight path section 414 (e.g., vehicle motion 422, wind speed, and wind direction). Other ones of operating condition(s) 421 may remain the same and/or constant throughout flight path section 414 (e.g., vehicle property 424).

Operating condition(s) 421 present along flight path section 414 may affect the amount of power and energy used by aerial vehicle 460 to traverse flight path section 414. Thus, power model 440 may be configured to determine power value 434 based on attribute value(s) 432. Power value 434 may represent an amount of power expected to be consumed by aerial vehicle 460 in connection with flight path section 414 given operating condition(s) 421 present along flight path section 414. Power value 434 may be represented using, for example, Watts. Specifically, power model 440 may be configured to predict how much power aerial vehicle 460 is likely to use given various predicted, measured, and/or planned properties of flight path section 414 as represented by attribute value(s) 432. As one example, power model 440 may be configured to determine power value 434 based on attribute value(s) 432 representing equivalent airspeed, commanded speed, horizontal acceleration, vertical acceleration, vertical speed, a type of aerial vehicle 460, presence of a package on aerial vehicle 460, air temperature, and air pressure.

Energy model 452 may be configured to determine energy value 450 based on power value 434. Energy value 450 may thus represent an amount of energy expected to be consumed by aerial vehicle 460 in connection with flight path section 414 given operating condition(s) 421 present along flight path section 414. For example, energy model 452 may be configured to integrate power value 434 over time. Energy model 452 may implement, for example, the Riemann integral and/or the trapezoidal integral, among other possibilities.

In some cases, flight path section 414 may be associated with a single power value 434 (e.g., when flight path section 414 is relatively short), which may represent an expected average power consumption for flight path section 414. In other cases, flight path section 414 may be associated with a plurality of power values 434 (e.g., when flight path section 414 is relatively long), which may represent expected instantaneous power consumptions along different sampled locations of flight path section 414. For example, power value 434 may represent an electrical power (e.g., average and/or instantaneous) expected to be consumed by aerial vehicle 460 during a corresponding one second interval along flight path section 414. Thus, when flight path section 414 corresponds to a period of time longer than one second, flight path section 414 may be associated with a plurality of power values 434, each associated with a corresponding one second portion of flight path section 414.

Power value 434 may be provided as input to energy model 452. For example, when power value 434 represents the average electrical power for a one second interval, energy value 450 may represent the amount of energy involved in generating the average electrical power over the one second interval. For example, if power value 434 is 100 Watts for a given one second portion of flight path section 414, then energy value 450 for this one second portion is 100 Watt-seconds (i.e., 100 Joules). By repeating the power and energy calculation for all point along flight path 412, energy model 452 can calculate power values 434 and energy values 450 for the entirety of flight path 412, given estimated amount(s) of time that aerial vehicle 460 is expected to take to traverse different portions of flight path 412.

Power model 440 may include a linear model (e.g., a linear regression model) and/or a nonlinear model (e.g., an artificial neural network). A linear model may be configured to generate output(s) that have a linear relationship with the input(s) to the linear model. For example, power model 440 may be considered to be a linear model if power model 440 determines power value 434 by multiplying attribute value(s) 432 by a weight vector and does not apply any additional nonlinear functions to the result of this multiplication. A non-linear model may include nonlinearities between the input(s) and the output(s) thereof, and thus may be configured to generate output(s) that have a nonlinear relationship with the input(s) to the non-linear model. For example, nonlinearities may be introduced by processing one or more of attribute value(s) 432 by a nonlinear function and/or processing, by the nonlinear function, an output of a multiplication of attribute value(s) 432 and the weight vector. Examples of nonlinear functions include exponentials, trigonometric functions (e.g., sine, cosine, tangent), logarithms, and/or combinations thereof, among other possibilities. Power model 440 may be a nonlinear model when it includes, for example, an artificial neural network that has at least one nonlinear activation function.

Power model 440 may be trained using training data, which may include a plurality of training samples. Each respective training sample of the plurality of training samples may be collected in connection with a corresponding training aerial vehicle and may include corresponding training attribute value(s) and a corresponding ground-truth power value. The corresponding training attributes may represent training operating condition(s) that were present while the training aerial vehicle was traversing a training flight path section. The ground-truth power value may represent an amount of power that has actually been consumed by the training aerial vehicle while traversing the training flight path section. The plurality of training samples may be collected in connection with a plurality of different aerial vehicles (e.g., differing in type/model, age, physical capabilities, maintenance history, etc.) of an aerial vehicle fleet, and may represent various combinations of operating conditions. Thus, the training data may illustrate how various operating conditions affect the power consumption of various aerial vehicles, and this relationship between operating conditions and power consumption may thus be learned through training of power model 440. For example, power model 440 may be trained using backpropagation and/or gradient descent, among other possibilities. The fleet of aerial vehicles may include aerial vehicle 460, which may be one of the different types of aerial vehicles of the fleet.

In some implementations, power model 440 may be configured to generate a feature vector based on attribute value(s) 432. Each value of the feature vector may be a result of a linear and/or nonlinear transformation of one or more values of attribute value(s) 432. A number of entries of the feature vector may be less than, equal to, or greater than a number of attribute value(s) 432. In some cases, the transformation(s) of attribute value(s) 432 performed to generate the feature vector may be learned as part of training. In other cases, the transformation(s) of attribute value(s) 432 performed to generate the feature vector may be predefined (e.g., by a developer familiar with operation of various aerial vehicles).

For example, the predefined feature vector may include and/or be based on: (i) a square of the equivalent air speed, (ii) a cube of the equivalent air speed, (iii) a product of the equivalent air speed and a forward commanded speed, (iv) a product of a square of equivalent airspeed and the forward commanded speed, (v) a product of the equivalent airspeed and a payload variable that indicates whether aerial vehicle 460 is carrying a payload, (vi) a product of a square of the equivalent airspeed and the payload variable, (vii) a product of a cube of the equivalent airspeed and the payload variable, (viii) a product of the payload variable and a forward commanded acceleration, (ix) a product of the payload variable and a vertical commanded acceleration, (x) a product of turning speed and the forward commanded speed, (xi) a product of a square of the turning speed and a square of the forward commanded speed, (xii) a product of altitude and air pressure, (xiii) a product of the altitude and air temperature, (xiv) a product of air pressure and air temperature, and (xv) a product of air pressure, air temperature, and altitude.

In some implementations, power model 440 may include a weight vector, which may be learned through training. For example, a number of entries in the weight vector may be equal to a number of attribute value(s) 432 and/or the number of entries of the feature vector. Power model 440 may be configured to determine power value 434 by, for example, (i) multiplying the weight vector by attribute value(s) 432 and/or (ii) multiplying the weight vector by the feature vector.

Power model 440 may include a plurality of models that are configured to be used in determining power value 434. For example, power model 440 may include fleet-wide model 442, vehicle-type-specific model 444, and/or vehicle-specific model 446. Each of fleet-wide model 442, vehicle-type-specific model 444, and vehicle-specific model 446 may be trained using training data samples obtained from a different subset of vehicles of the aerial vehicle fleet. The accuracy of fleet-wide model 442, vehicle-type-specific model 444, and vehicle-specific model 446 with respect to a given aerial vehicle may thus vary. By using two or more of fleet-wide model 442, vehicle-type-specific model 444, and vehicle-specific model 446 together, power model 440 may be able to generate power values that are more accurate across a wider range of aerial vehicles of the aerial vehicle fleet while potentially reducing the usage of computing resources.

Fleet-wide model 442 may be trained using fleet-wide training data gathered from the plurality of different aerial vehicles of the aerial vehicle fleet. Thus, the fleet-wide training data may represent how power usage of various different types of aerial vehicles is affected by variations in operating condition(s) 421. Fleet-wide model 442 may generate power values that are accurate for the aerial vehicle fleet as a whole (e.g., for the average aerial vehicle in the fleet), but that may sometimes be inaccurate for some types of aerial vehicles (e.g., vehicles that significantly differ from the average vehicle in the fleet). Since fleet-wide model 442 is trained using fleet-wide training data, there may be more training samples available for training of fleet-wide model 442 than for training of vehicle-type-specific model 444 and/or vehicle-specific model 446. For example, fleet-wide model 442 may be able to utilize training samples from all available aerial vehicles in the aerial vehicle fleet. Fleet-wide model 442 might not be specialized with respect to any particular type of aerial vehicle.

Vehicle-type-specific model 444 may be trained using vehicle-type-specific training data gathered from aerial vehicles of a particular type. For example, vehicle-type-specific model 444 may be specific to a type of aerial vehicle 460. Thus, the vehicle-type-specific training data may represent how power usage of the particular types of aerial vehicle is affected by variations in operating condition(s) 421. A first aerial vehicle may be considered to be of a different type than a second aerial vehicle when these two vehicles differs by at least one physical component (e.g., wing structure, propulsion system type, number of propellers, shell, frame, etc.). For example, when the first aerial vehicle is of a first aerial vehicle model having a first physical structure and the second aerial vehicle is of a second aerial vehicle model having a second physical structure, these two vehicles may be considered to be of different types when the first physical structure differs from the second physical structure.

Vehicle-type-specific model 444 may generate power values that are accurate for aerial vehicles of the particular type, but that may sometimes be inaccurate for other types of aerial vehicles (e.g., vehicles that significantly differ in their physical configuration from the particular type of aerial vehicle). Accordingly, in some implementations, power model 440 may include a plurality of vehicle-type-specific models 444, each configured to operate with respect to a corresponding type of aerial vehicle. For example, the plurality of vehicle-type-specific models 444 may include models for each type of aerial vehicle in the fleet, and may thus span the entirety of the aerial vehicle fleet.

Since each vehicle-type-specific model 444 is trained using vehicle-type-specific training data, there may be (i) fewer training samples available for training of vehicle-type-specific model 444 than fleet-wide model 442 and (ii) more training samples available for training of vehicle-type-specific model 444 than for training of vehicle-specific model 446. For example, vehicle-type-specific model 444 may be able to utilize training samples from all aerial vehicles of the particular type. Vehicle-type-specific model 444 may be specialized with respect to the particular type of aerial vehicle, and the outputs thereof may thus be more accurate for aerial vehicles of the particular type than outputs of fleet-wide model 442. Vehicle-type-specific model 444 may thus offer a middle ground between the generality of fleet-wide model 442 and the specificity of vehicle-specific model 446.

Vehicle-specific model 446 may be trained using vehicle-specific training data gathered from a single aerial vehicle. For example, vehicle-specific model 446 may be specific to aerial vehicle 460, and may be trained using vehicle-specific training data obtained exclusively from aerial vehicle 460. Thus, the vehicle-specific training data may represent how power usage of aerial vehicle 460 is affected by variations in operating condition(s) 421. Vehicle-specific model 446 may generate power values that are accurate for aerial vehicle 460, but that may sometimes be inaccurate for other aerial vehicles both of the same or different type as aerial vehicle 460. Accordingly, in some implementations, power model 440 may include a plurality of vehicle-specific models 446, each configured to operate with respect to a corresponding aerial vehicle in the fleet. For example, the plurality of vehicle-specific models 446 may include models for each aerial vehicle in the fleet, and may thus span the entirety of the aerial vehicle fleet.

Since each vehicle-specific model 446 is trained using vehicle-specific training data, there may be fewer training samples available for training of vehicle-specific model 446 than fleet-wide model 442 and vehicle-type-specific model 444. Vehicle-specific model 446 may be specialized with respect to aerial vehicle 460, and the outputs thereof may thus be more accurate for aerial vehicle 460 than outputs of fleet-wide model 442 and/or vehicle-type-specific model 444. However, vehicle-specific model 446 may be more difficult to train than fleet-wide model 442 and/or vehicle-specific model 446 due to the lower availability of training data.

In some embodiments, the plurality of models of power model 440 may be used as an ensemble. For example, each of fleet-wide model 442, vehicle-type-specific model 444, and vehicle-specific model 446 may be configured to determine a corresponding power value representing an amount of power expected to be consumed by aerial vehicle 460 in connection with the flight path section 414, and power model 440 may determine power value 434 based on a combination of the corresponding power values. For example, power value 434 may be expressed as a weighted sum $P_{TOTAL}=w_F P_F+w_T P_T+w_V P_V$, where $P_{TOTAL}$ represents power value 434, $P_F$ represents an output of fleet-wide model 442, $P_T$ represents an output of vehicle-type-specific model 444, $P_V$ represents an output of vehicle-specific model 446, and $w_F$, $w_T$, and $w_V$ represent respective weights of $P_F$, $P_T$, and $P_V$. The output of each of fleet-wide model 442, vehicle-type-specific model 444, and vehicle-specific model 446 may be independent of an output of the other models of power model 440 (i.e., fleet-wide model 442, vehicle-type-specific model 444, and vehicle-specific model 446 may operate independently of one another).

In some embodiments, the plurality of models of power model 440 may be used sequentially, with a given model generating its output based on an output of a preceding model. For example, fleet-wide model 442 may be configured to generate a first power value. The first power value may be inaccurate under some circumstances. To correct for this inaccuracy, the first power value may be provided as input to vehicle-type-specific model 444. Based thereon (and possibly one or more of attribute value(s) 432), vehicle-type-specific model 444 may be configured to generate a second power value. The second power value may also be inaccurate under some circumstances (albeit more accurate than the first power value). To further correct for this inaccuracy, the second power value may be provided as input to vehicle-specific model 446. Based thereon (and possibly one or more of attribute value(s) 432), vehicle-specific model 446 may be configured to generate a third power value.

In some cases, each of the first power value, the second power value, and the third power value may be an absolute power value, with the second power value representing a refinement of the first power value, the third power value representing a refinement of the second power value, and the third power value being equal to power value 434. Thus, $P_{TOTAL}=P_V$, where $P_V=f_V(P_T, A_V)$, $P_T=f_T(P_F, A_T)$, $P_F=f_F(A_F)$, $f_F(\ )$ represents fleet-wide model 442, $f_T(\ )$ represents vehicle-type-specific model 444, $f_V(\ )$ represents vehicle-specific model 446, $A_F$ represents one or more of attribute value(s) 432 used by fleet-wide model 442, $A_T$ represents one or more of attribute value(s) 432 used by vehicle-type-specific model 444, and $A_V$ represents one or more of attribute value(s) 432 used by vehicle-specific model 446.

In other cases, rather than generating absolute power values, one or more of the plurality of models of power model 440 may be used to generate a correction value that represents an error of at least one other model of the plurality of models. For example, fleet-wide model may be configured to generate the first power value that represents the amount of power expected to be consumed by aerial vehicle 460 in connection with flight path section 414. To correct for inaccuracies in the first power value, vehicle-type-specific model 444 may be configured to generate a first correction value that represents an error of fleet-wide model 442 in determining the first power value. The first power value may represent an absolute power estimate, while the first correction value may represent a residual error relative to this absolute power estimate. Thus, the second power value may be determined by adding the first power value and the first correction value.

To correct for inaccuracies in the second power value, vehicle-specific model 446 may be configured to generate a second correction value that represents an error of fleet-wide model 442 and/or vehicle-type-specific model 444 in determining the second power value. The second power value may represent an absolute power estimate, while the second correction value may represent a residual error relative to this absolute power estimate. Thus, the third power value may be determined by adding the second power value and the second correction value. Thus, $P_{TOTAL}=P_V$, where $$P_V = P_T + f_V^*(A_V),\ P_T = P_F + f_T^*(A_T),\ P_F = f_F(A_F),\ f_T^*(\ )$$

represents vehicle-type-specific model 444 when configured to generate the first error value, and $f^*_V(\ )$ represents vehicle-specific model 446 when configured to generate the second error value.

Using the plurality of models of power model 440 in combination with one another may allow power model 440 to benefit from the large amount of training data that may be available in a diverse vehicle fleet while also accounting for vehicle-type-specific and/or vehicle-specific variations in power consumption. Further, using a separate fleet-wide model 442, vehicle-type-specific model 444, and vehicle specific model 446 (rather than a single model that receives as input a vehicle type indicator and/or a vehicle instance indicator) may allow power model 440 to use smaller models that may be faster to execute, may be easier to train/retrain, and/or may consume fewer computing resources, while providing at least a target accuracy of outputs.

In some implementations, the plurality of models of power model 440 may generate their respective outputs based on different subsets of attribute value(s) 432. As one example, fleet-wide model 442 may be configured to receive as input all of attribute value(s) 432, vehicle-type-specific model 444 may be configured to receive as input a first proper subset of attribute value(s) 432, and vehicle-specific model 446 may be configured to receive as input a second proper subset of the first proper subset. Thus, vehicle-type-specific model 444 may be configured to process fewer inputs than fleet-wide model 442, and vehicle-specific model 446 may be configured to process fewer inputs than vehicle-type-specific model 444, thus allowing these models to be proportionately smaller, and thus faster to execute, depend on less training data, and/or utilize fewer computing resources.

As another example, fleet-wide model 442 may be configured to receive as input a third proper subset of attribute value(s) 432, vehicle-type-specific model 444 may be configured to receive as input a fourth proper subset of attribute value(s) 432, and vehicle-specific model 446 may be configured to receive as input a fifth proper subset of attribute value(s) 432. The third proper subset, the fourth proper subset, and the fifth proper subset may overlap with one another, may be mutually exclusive of one another, and/or may vary in size relative to one another. The respective subset of attribute value(s) 432 that is useful to a given model of power model 440 may be determined experimentally and/or may be an inherent property of some aerial vehicles. For example, vehicle-type-specific model 444 corresponding to an aerial vehicle type that is not configured to carry payloads might not be configured to process an indication of whether the aerial vehicle is carrying a payload. As another example, an attribute value that, when experimentally varied across its full range, does not significantly (e.g., beyond a threshold) affect the power value generated by a given model may be omitted as an input of the given model. Thus, theoretical knowledge and/or experimental results may be used by a programmer to select the respective subsets of attribute value(s) 432 that are utilized by each model of power model 440.

In some implementations, one or more models of power model 440 may be trained and/or retrained as aerial vehicle 460 traverses flight path 412. Such a model may be considered to be a flight-specific model. For example, aerial vehicle 460 may traverse a first section or portion of flight path 412. Energy system 400 may be configured to determine a flight-specific training sample that includes (i) one or more attribute value(s) representing operating condition(s) that have actually been experienced by aerial vehicle 460 at the first section or portion of flight path 412, (ii) a power value representing an amount of power that has actually been consumed by aerial vehicle 460 in connection with traversing the first section or portion of flight path 412, and/or (iii) an energy value representing an amount of energy that has actually been consumed by aerial vehicle 460 in connection with traversing the first section or portion of flight path 412. Thus, the flight-specific training sample may represent the actual operating conditions that aerial vehicle 460 encountered along the first section or portion of flight path 412, and the resulting power and/or energy consumption of aerial vehicle 460.

The flight-specific training sample may be used to train or retrain, for example, vehicle-specific model 446 (e.g., vehicle-specific model 446 may be a flight-specific model). In some cases, vehicle-specific model 446 may be retrained each time a new flight-specific training sample is available, thus allowing power model 440 to adapt to and/or learn from flight path 412 mid-flight. After retraining, vehicle-specific model 446 may be used to generate power values for one or more subsequent sections or portions of flight path 412 based on attribute value(s) corresponding thereto. Thus, vehicle-specific model 446 may learn how flight-specific factors are affecting the power usage of aerial vehicle 460, and may use this information to generate more accurate power predictions for subsequent sections or portions of flight path 412 that aerial vehicle 460 has not yet traversed, thus increasing the accuracy of power model 440 in generating power values.

Alternatively, rather than using the flight-specific training sample to retrain vehicle-specific model 446, the flight-specific training sample may instead be provided as an additional input to vehicle-specific model 446. Thus, vehicle-specific model 446 may be configured to use the flight-specific training sample as an additional input in generating the power values for the one or more subsequent sections or portions of flight path 412.

Power model 440 may be updated (e.g., retrained, the architecture thereof may be modified, etc.) over time to adjust to changes in composition of the fleet, flight patterns of the aerial vehicles, software executed by the aerial vehicles, and/or other changes that affect power and/or energy usage by aerial vehicles. For example, one or more models of power model 440 may be updated when an amount of power that has actually been consumed by aerial vehicle 460 in connection with traversing flight path section 414 differs from power value 434 by more than a threshold power value. As another example, one or more models of power model 440 may be updated when an amount of energy that has actually been consumed by aerial vehicle 460 in connection with traversing flight path section 414 differs from energy value 450 by more than a threshold energy value. As a further example, one or more models of power model 440 may be updated when more than a threshold number of contingency response operations are executed by aerial vehicles of the fleet. That is, power model 440 may be updated when power values 434 generated thereby and/or energy values 450 generated based on power values 434 are significantly erroneous.

In some cases, the error of power model 440 may be determined based on attribute value(s) representing operating condition(s) that have actually been experienced by aerial vehicle 460 at flight path section 414, rather than based on attribute value(s) 432 (which represent a prediction of the operating condition). Specifically, power model 440 may be updated when the power and/or energy values determined using power model 440 based on actual operating condition(s) are significantly erroneous. Thus, error in predicting attribute value(s) of operating condition(s) 421 might be separated from the error of power model 440 itself in determining accurate power values. Accordingly, power model 440 may be updated when its outputs lead to erroneous power and/or energy values independently of errors due to other parts of energy system 400.

Flight planner 410 may use energy value 450 to determine and/or adjust flight path 412 and/or sections thereof. For example, flight planner 410 may add flight path section 414 to flight path 412, modify flight path section 414, or delete flight path section 414 from flight path 412. The same or similar operations may also be carried out with respect to other flight path sections of flight path 412. For example, a plurality of candidate flight path sections may be evaluated by energy system 400 to determine flight path 412 such that flight path 412 is executable using less than a threshold amount of energy. Flight path 412 may be determined and/or adjusted before aerial vehicle 460 starts traversing flight path 412 and/or while aerial vehicle 460 is traversing a section of flight path 412. In some cases, flight planner 410 may use energy values 450 generated by energy system 400 to determine flight paths that reduce and/or minimize energy consumption by aerial vehicle 460.

VI. Example Power and Energy Graphs

Figure 5A:
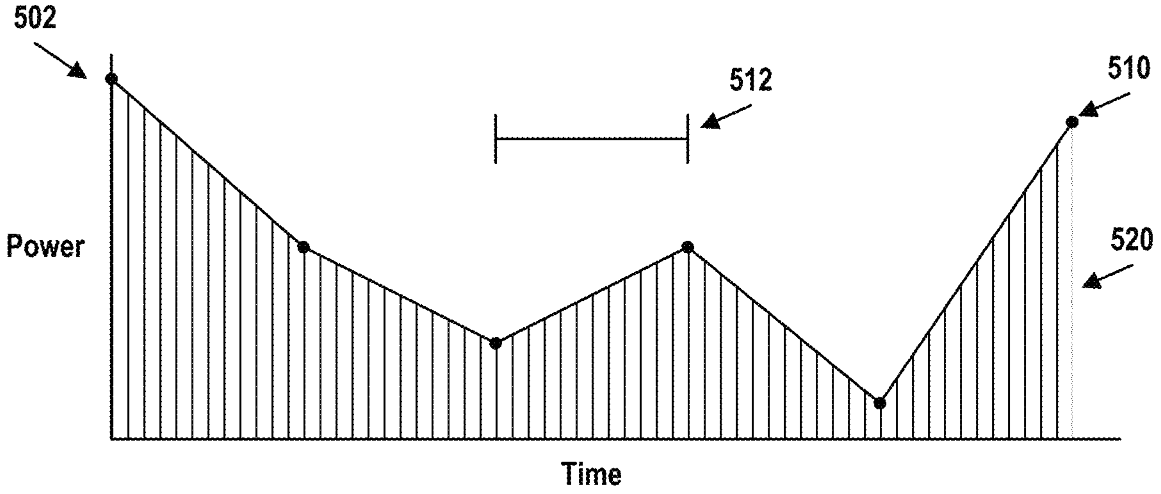
FIG. 5A illustrates a graph of a predicted power over time, in accordance with examples described herein.

FIG. 5A illustrates an example graph 502 of power over time. Graph 502 provides examples of power values and energy values for different points in time. Specifically, curve 510 represents six power values (indicated by black dots along curve 510), and the area 520 under curve 510 represents energy values corresponding thereto. Curve 510 may represent, for example, an output of fleet-wide model 442. The energy values may be calculated from the power values of curve 510 by determining an area under curve 510, which is equivalent to and/or approximates the integral of the power values. For example, section 512 may correspond to flight path section 414. Thus, the power value at the start of section 512 may represent a first power value determined for a first portion of flight path section 414, the power value at the end of section 512 may represent a second power value determined for a second portion of flight path section 414, and the area under curve 510 in section 512 may represent energy value 450 determined for flight path section 414.

Although different flight path sections of flight path 412 are shown in this example as taking the same amount of time, the flight path sections could alternatively and/or additionally have variable lengths. In some cases, power values may be sampled more densely and/or less densely than shown in graph 502. For example, flight path sections on which aerial vehicle 460 is expected to exhibit low variations in behavior (e.g., flying straight at constant altitude) may be sampled less densely (e.g., fewer power values per unit time or distance traveled) than flight path sections on which aerial vehicle 460 is expected to exhibit high variations in behavior (e.g., change altitude, change direction, pick-up or drop-of a package, etc.).

Figure 5B:
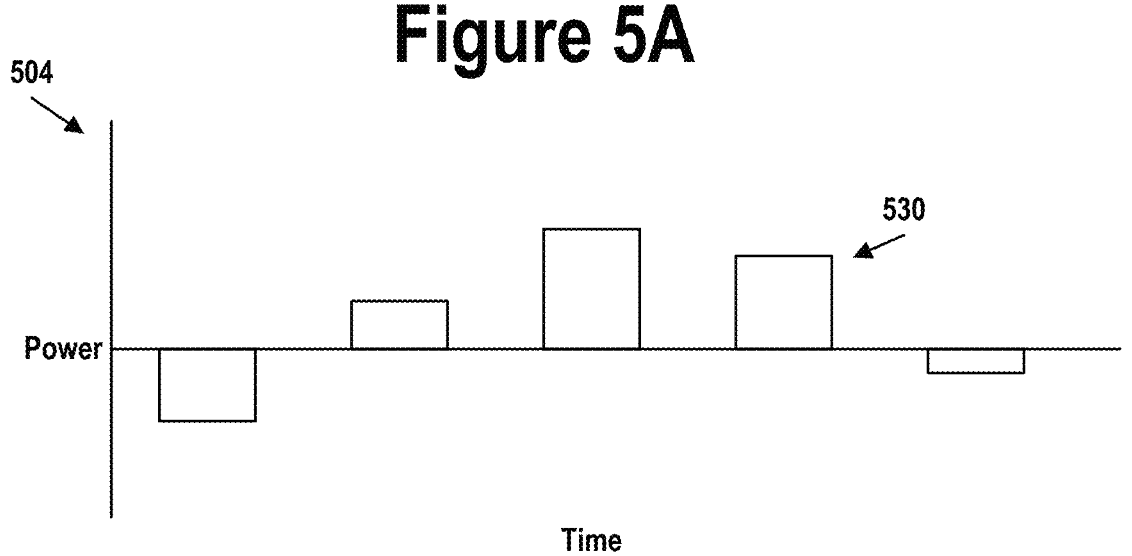
FIG. 5B illustrates a graph of correction values over time, in accordance with examples described herein.

FIG. 5B illustrates an example graph 504 of correction values generated by one or more models of power model 440. For example, the correction values may be generated by vehicle-type-specific model 444, and may represent corrections to power values generated by fleet-wide model 442. Each of bars 530 illustrates a corresponding correction value, which may be positive or negative. While these correction values represent corrections to power predictions, the correction values may additionally or alternatively represent corrections to energy predictions. In the example of graph 504, each of the correction values corresponds to a respective flight path section, and may be used to correct all power values associated with the respective flight path section. For example, the third bar from the left of bars 530 corresponds to section 512 of curve 510, and may thus be used to adjust all power values generated in connection with flight path section 414.

Figure 5C:
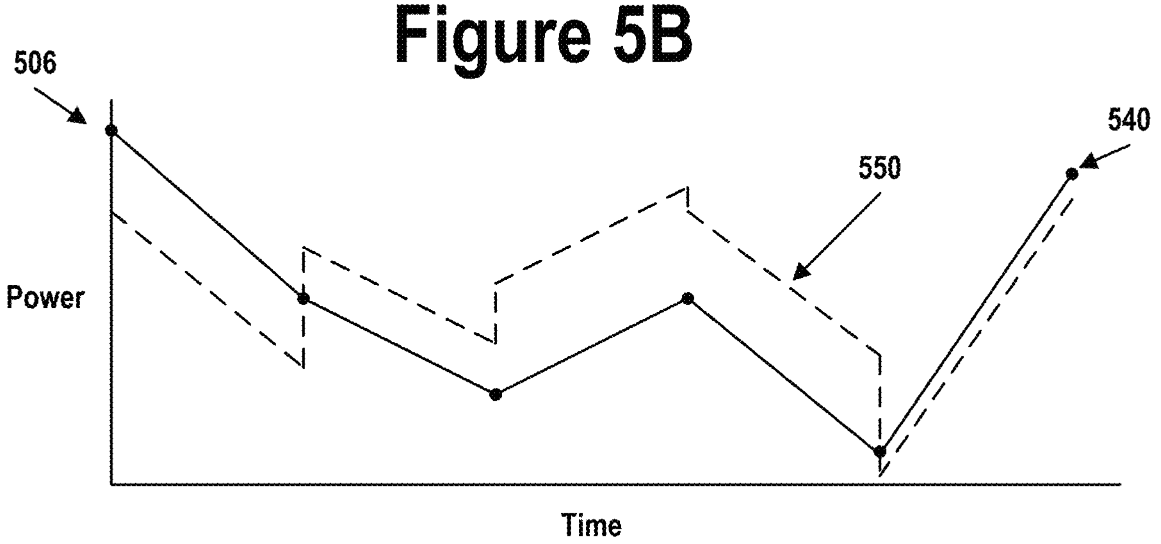
FIG. 5C illustrates a graph of predicted power over time, in accordance with examples described herein.

FIG. 5C illustrates graph 506 of example power values 434 over time, as determined by power model 440. Graph 506 may include curve 540 and curve 550. Curve 540 may be equal to curve 510 of FIG. 5A, and curve 550 may represent curve 540 adjusted based on the correction values of graph 504. Thus, each respective section of curve 540 is either increased or decreased according to the correction value corresponding to the respective section. For example, the power values of section 512 are increased by the correction value represented by the third bar of bars 530 of graph 504, resulting in the corresponding power value 434 for flight path section 414 (assuming that vehicle-specific model 446 is not used to further adjust this power value).

VII. Additional Example Operations

Figure 6:
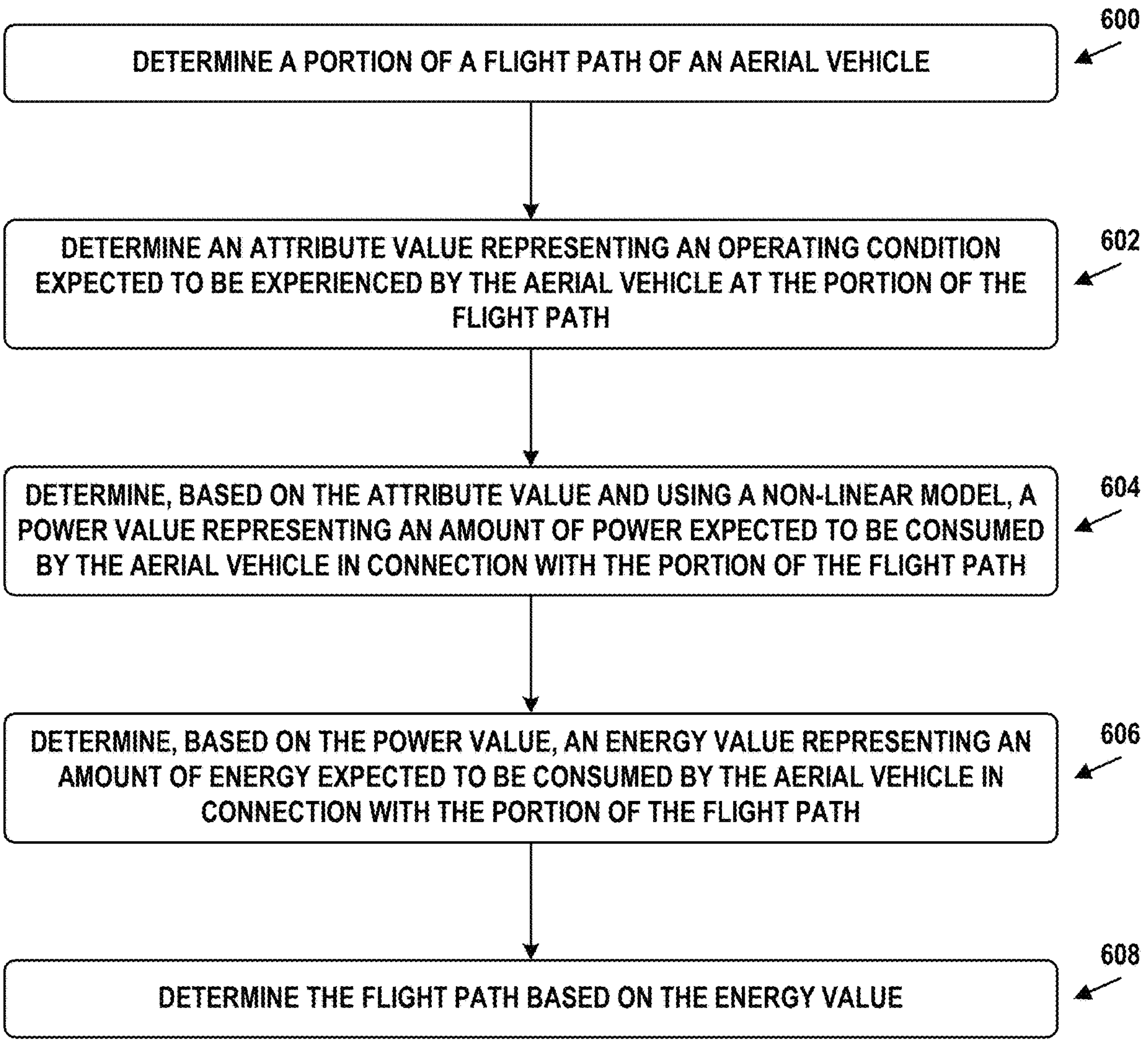
FIG. 6 is a flow chart, in accordance with examples described herein.

FIG. 6 illustrates a flow chart of operations related to determining power values and/or energy values corresponding to a portion of a flight path. The embodiments of FIG. 6 may be simplified by the removal of any one or more of the features shown therein. Further, these embodiments may be combined with features, aspects, and/or implementations of any of the previous figures or otherwise described herein.

Block 600 may involve determining a portion of a flight path of an aerial vehicle.

Block 602 may involve determining an attribute value representing an operating condition expected to be experienced by the aerial vehicle at the portion of the flight path.

Block 604 may involve determining, based on the attribute value and using a non-linear model, a power value representing an amount of power expected to be consumed by the aerial vehicle in connection with the portion of the flight path.

Block 606 may involve determining, based on the power value, an energy value representing an amount of energy expected to be consumed by the aerial vehicle in connection with the portion of the flight path.

Block 608 may involve determining the flight path based on the energy value.

In some examples, the non-linear model may include a fleet-wide model that has been trained using fleet-wide training data obtained from a plurality of vehicle types of aerial vehicles in an aerial vehicle fleet. The plurality of vehicle types may include a vehicle type of the aerial vehicle.

In some examples, determining the power value may include determining, based on the attribute value and using the fleet-wide model, a first power value representing a first amount of power expected to be consumed by the aerial vehicle in connection with the portion of the flight path. Determining the power value may also include determining, based on the attribute value and using a vehicle-type-specific model corresponding to the vehicle type of the aerial vehicle, a correction value representing an error of the fleet-wide model in determining the first power value for the vehicle type of the aerial vehicle. The vehicle-type-specific model may have been trained using vehicle-type-specific training data that is a proper subset of the fleet-wide training data. Determining the power value may further include determining, based on the first power value and the correction value, a second power value representing a second amount of power expected to be consumed by the aerial vehicle in connection with the portion of the flight path.

In some examples, the attribute value may include a plurality of attribute values representing a plurality of operating conditions expected to be experienced by the aerial vehicle at the portion of the flight path. The fleet-wide model may be configured to determine the first power value based on the plurality of attribute values. The vehicle-type-specific model may be configured to determine the correction value based on a proper subset of the plurality of attribute values.

In some examples, the vehicle-type-specific model may be configured to determine the correction value further based on the first power value.

In some examples, the vehicle-type-specific model may include a linear model.

In some examples, each respective vehicle type of the plurality of vehicle types may have a physical configuration that differs by at least one physical component from respective physical configurations of other vehicle types of the plurality of vehicle types.

In some examples, the non-linear model may include a vehicle-type-specific model that has been trained using vehicle-type-specific training data that is a proper subset of fleet-wide training data obtained from a plurality of vehicle types of aerial vehicles in an aerial vehicle fleet. The plurality of vehicle types may include a vehicle type of the aerial vehicle. The power value may be specific to the vehicle type of the aerial vehicle.

In some examples, the non-linear model may include a vehicle-specific model that has been trained using vehicle-specific training data obtained from the aerial vehicle. The power value may be specific to the aerial vehicle.

In some examples, the portion of the flight path may be a first portion of the flight path, the attribute value may be a first attribute value, and the power value may be a first power value. The aerial vehicle may be caused to traverse the first portion of the flight path. A second attribute value representing an operating condition that has actually been experienced by the aerial vehicle at the first portion of the flight path may be determined. A third attribute value representing an operating condition expected to be experienced by the aerial vehicle at a second portion of the flight path that follows the first portion of the flight path may be determined. A second power value representing an amount of power expected to be consumed by the aerial vehicle in connection with the second portion of the flight path may be determined using a flight-specific model and based on the second attribute value and the third attribute value. The flight path may be updated based on the second power value.

In some examples, determining the second power value may include training the flight-specific model based on the second attribute value and a third power value representing an amount of power that has actually been consumed by the aerial vehicle in connection with traversing the first portion of the flight path. Determining the second power value may also include determining the second power value by processing the third attribute value using the flight-specific model.

In some examples, the operating condition expected to be experienced by the aerial vehicle at the portion of the flight path may include one or more of: (i) a motion expected to be performed by the aerial vehicle at the portion of the flight path, (ii) a physical property that the aerial vehicle is expected to have at the portion of the flight path, or (iii) an environmental condition expected to be experienced by the aerial vehicle at the portion of the flight path. The physical property may include at least one of a vehicle type of the aerial vehicle, a weight of the aerial vehicle, a cross-section of the aerial vehicle, or a property of a payload carried by the aerial vehicle.

In some examples, the non-linear model may include a neural network.

In some examples, determining the power value using the non-linear model may include determining a feature vector by applying a non-linear function to the attribute value, and multiplying the feature vector by a weight vector that represents a relative weight assigned to the attribute value by the non-linear model.

In some examples, determining the energy value may include determining an integral over the portion of the flight path based on the power value.

In some examples, the energy value may be a first energy value. The aerial vehicle may be caused to traverse the flight path. A second energy value representing an amount of energy that has actually been consumed by the aerial vehicle in connection with traversing the portion of the flight path may be determined. It may be determined that the second energy value differs from the first energy value by more than a threshold energy value. Based on determining that the second energy value differs from the first energy value by more than the threshold energy value, the non-linear model may be updated.

In some embodiments, the power value may be a first power value, and the attribute value may be a first attribute value. The aerial vehicle may be caused to traverse the flight path. A second attribute value representing an operating condition that has actually been experienced by the aerial vehicle at the portion of the flight path may be determined. A second power value representing an amount of power that has been consumed by the aerial vehicle in connection with traversing the portion of the flight path may be determined. Based on the second attribute value and using the non-linear model, a third power value representing an amount of power that the non-linear model expects to have been consumed by the aerial vehicle in connection with traversing the portion of the flight path may be determined. The non-linear model may be updated based on a difference between the second power value and the third power value.

In some embodiments, determining the portion of the flight path may include determining a plurality of candidate portions of the flight path. Determining the attribute value may include determining, for each respective candidate portion of the plurality of candidate portions, a corresponding attribute value representing an operating condition expected to be experienced by the aerial vehicle at the respective candidate portion of the flight path. Determining the power value may include, for each respective candidate portion of the plurality of candidate portions, determining, based on the corresponding attribute value and using the non-linear model, a corresponding power value representing an amount of power expected to be consumed by the aerial vehicle in connection with the respective candidate portion of the flight path. Determining the energy value may include, for each respective candidate portion of the plurality of candidate portions, determining, based on the corresponding power value, a corresponding energy value representing an amount of energy expected to be consumed by the aerial vehicle in connection with the respective candidate portion of the flight path. Determining the flight path may include selecting, from the plurality of candidate portions and based on the corresponding energy values thereof, two or more candidate portions to define the flight path.

VIII. Example Contingency System

Figure 7:
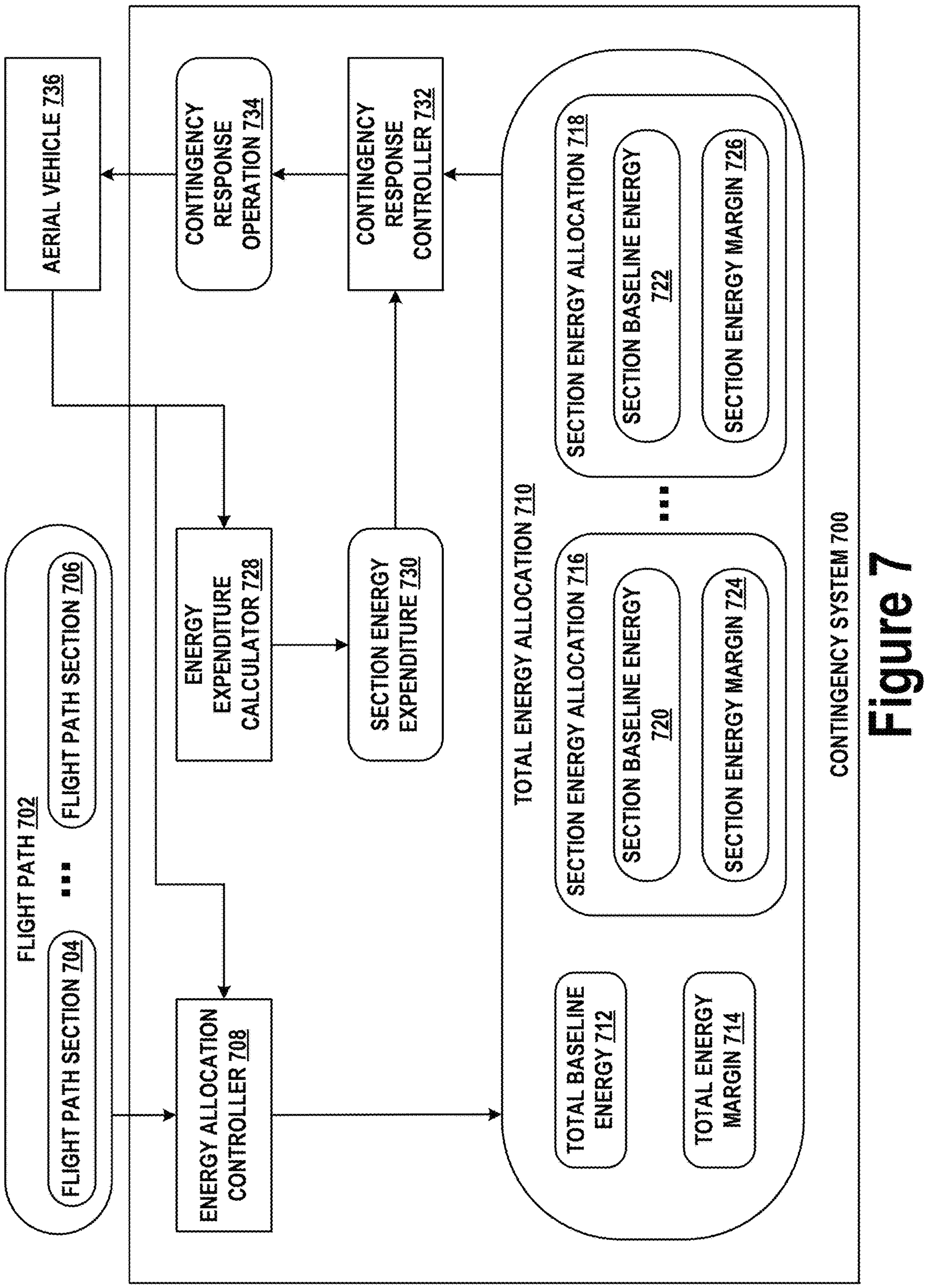
FIG. 7 illustrates a contingency system, in accordance with examples described herein.

FIG. 7 illustrates an example contingency system 700. Contingency system 700 includes energy allocation controller 708, energy expenditure calculator 728, and contingency response controller 732. Contingency system 700 may be used in connection with aerial vehicle 736, which may correspond to and/or represent aerial vehicle 460, and/or UAV 100, 120, 140, 160, 180, and/or 200, among other possibilities. Flight path 702 may include flight path section 704 through flight path section 706 (i.e., flight path sections 704-706). For example, flight path 702 may be formed by the sequence of flight path sections 704-706. Flight path 702 may represent and/or correspond to flight path 412.

Energy allocation controller 708 may be configured to determine total energy allocation 710 for flight path 702 based on flight path 702 and attribute(s) of an energy storage system of aerial vehicle 736. The attribute(s) of the energy storage system may represent how much energy is, is expected, and/or is planned to be available to aerial vehicle 736 in connection with traversing flight path 702. For example, the attribute(s) may represent an amount of energy stored, expected to be stored, and/or planned to be stored in a battery of aerial vehicle 736 at the start of flight path 702. Energy allocation controller 708 may include, utilize, and/or form part of energy system 400. Thus, for example, total energy allocation 710 may be based on energy values generated by energy model 452 in connection with flight path 702.

Total energy allocation 710 may represent an energy usage plan for aerial vehicle 736 when traversing flight path 702. Total energy allocation 710 may include total baseline energy 712, total energy margin 714, and section energy allocation 716 through section energy allocation 718 (i.e., section energy allocations 716-718). Total baseline energy 712 and total energy margin 714 may be determined according to $E_{BATTERY} \geq E_{TB} + E_{TM}$, where $E_{BATTERY}$ represent an actual, expected, and/or planned energy content of the battery of aerial vehicle 736, $E_{TB}$ represents total baseline energy 712, and $E_{TM}$ represents total energy margin 714.

Total baseline energy 712 may include an energy value representing an amount of energy expected to be consumed by aerial vehicle 736 in connection with traversing flight path 702. For example, total baseline energy 712 may represent a prediction generated by energy system 400 as to how much energy aerial vehicle 736 is expected to use given the operating conditions that aerial vehicle 736 is expected to encounter along flight path 702.

Total energy margin 714 may include an energy value representing an amount of energy by which aerial vehicle 736 is permitted to exceed total baseline energy 712 when traversing flight path 702. Thus, total energy margin 714 may allow for error in predictions generated by energy system 400. In some cases, total energy margin 714 may represent a predetermined fraction (e.g., 5%, 7.5%, 10%, 15%, 25%, etc.) of total baseline energy 712. In other cases, total energy margin 714 may be based on and/or correspond to variability, volatility, and/or uncertainty in the operating conditions that aerial vehicle 736 is expected to encounter along flight path 702. For example, energy system 400 may be configured to express one or more of attribute value(s) 432 using a corresponding mean value and a corresponding standard deviation value. Total baseline energy 712 may thus correspond to the expected energy usage when each of attribute value(s) 432 has its corresponding mean value. Total energy margin 714 may represent a difference between (i) total baseline energy 712 and (ii) the expected energy usage when each of attribute value(s) 432 diverges from its corresponding mean value by a predetermined number of standard deviations (e.g., by one standard deviation) in a direction that increases power and/or energy usage.

Section energy allocations 716-718 may represent a division of total baseline energy 712 and total energy margin 714 among flight path sections 704-706. Specifically, section energy allocation 716 may correspond to flight path section 704, and may include section baseline energy 720 and section energy margin 724. Section energy allocation 718 may correspond to flight path section 706, and may include section baseline energy 722 and section energy margin 726. Total baseline energy 712 may be expressed as $E_{TB}=E_{SB\_720}+ \ldots +E_{SB\_722}$, where $E_{SB\_720}+ \ldots +E_{SB\_722}$ represents a sum of section baseline energy 720 through section baseline energy 722. Total energy margin 714 may be expressed as $E_{TM}=E_{SM\_724}+ \ldots +E_{SM\_726}$, where $E_{SM\_724}+ \ldots +E_{SM\_726}$ represents a sum of section energy margin 724 through section energy margin 726.

Thus, section baseline energies 720-722 may provide, for corresponding ones of flight path sections 704-706, information similar to that provided by total baseline energy 712 for flight path 702 as a whole. For example, section baseline energy 720 may include an energy value representing an amount of energy expected to be consumed by aerial vehicle 736 in connection with traversing flight path section 704. Section baseline energy 720 may represent a prediction generated by energy system 400 as to how much energy aerial vehicle 736 is expected to use given the operating conditions that aerial vehicle 736 is expected to encounter along flight path section 704.

Similarly, section energy margins 724-726 may provide, for corresponding ones of flight path sections 704-706, information similar to that provided by total energy margin 714 for flight path 702 as a whole. For example, section energy margin 724 may include an energy value representing an amount of energy by which aerial vehicle 736 is permitted to exceed section baseline energy 720 when traversing flight path section 704. Thus, section energy margin 724 may allow for error in predictions generated by energy system 400.

Energy expenditure calculator 728 may be configured to determine section energy expenditure 730 of aerial vehicle 736 observed in connection with traversing one or more of flight path sections 704-706 of flight path 702 by aerial vehicle 736. Section energy expenditure 730 may represent an amount of energy that has actually been consumed by aerial vehicle 736 while traversing one or more flight path sections of flight path sections 704-706, and may thus be determined after aerial vehicle 736 completes the one or more flight path sections.

For example, section energy expenditure 730 may include, for each respective completed flight path section of flight path sections 704-706, a corresponding section energy expenditure value representing how much energy aerial vehicle 736 has used when traversing the respective completed flight path section. Additionally or alternatively, section energy expenditure may include a cumulative section energy expenditure value representing how much total energy aerial vehicle 736 has used when traversing a completed portion of flight path 702, where the completed portion of flight path 702 includes one or more completed flight path sections of flight path sections 704-706.

Contingency response controller 732 may be configured to determine contingency response operation 734 based on total energy allocation 710 and section energy expenditure 730. Specifically, contingency response controller 732 may be configured to determine whether aerial vehicle 736 is likely to exceed total energy allocation 710 for flight path 702 as a whole given section energy expenditure 730 observed in connection with a completed portion of flight path 702 that has already been traversed by aerial vehicle 736. When contingency response controller 732 determines that aerial vehicle 736 is likely to exceed total energy allocation 710, contingency response controller 732 may be configured to determine contingency response operation 734, which may represent one or more adjustments to flight path 702 that aerial vehicle 736 is expected to be able to complete given a remaining energy available to aerial vehicle 736. Contingency response controller 732 may thus compensate and/or correct for errors and/or inaccuracies in the planned energy usage of aerial vehicle 736 in connection with flight path 702.

In some cases, contingency response controller 732 may be configured to determine whether section energy expenditure 730 exceeds one or more of section energy allocations 716-718. As one example, contingency response controller 732 may be configured to determine that a cumulative section energy expenditure (represented as part of section energy expenditure 730) for a completed portion of flight path 702 exceeds a section energy allocation for the completed portion. The completed portion of flight path 702 may include a plurality of contiguous flight path sections of flight path sections 704-706 (e.g., flight path section 704 and a second flight path section, as indicated by the ellipsis, that follows flight path section 704), and may thus be referred to as a completed cumulative portion. Contingency response controller 732 may thus determine whether aerial vehicle 736 is using more energy than has been budgeted by energy allocation controller 708 for the completed section of flight path 702. Contingency response controller 732 may determine that, given that the cumulative section energy expenditure of the completed section exceeds a section energy allocation thereof, the energy expenditure for flight path 702 as a whole is likely to exceed total energy allocation 710, and contingency response controller 732 may thus determine contingency response operation 734.

As another example, contingency response controller 732 may be configured to determine whether an individual section energy expenditure (represented as part of section energy expenditure 730) for any individual completed section of flight path sections 704-706 exceeds a section energy allocation for the individual completed section. For example, contingency response controller 732 may be configured to determine that the individual section expenditure for flight path section 704 exceeds section energy allocation 716. Contingency response controller 732 may thus determine that, in traversing flight path section 704, aerial vehicle 736 is using more energy than has been budgeted by energy allocation controller 708 for flight path section 704. Contingency response controller 732 may determine that, given than the individual section energy expenditure of flight path section 704 exceeds section energy allocation 716, the energy expenditure for flight path 702 as a whole is likely to exceed total energy allocation 710, and contingency response controller 732 may thus determine contingency response operation 734.

As a further example, contingency response controller 732 may be configured to determine whether the individual section energy expenditure of at least a threshold number of individual completed section of flight path sections 704-706 exceeds the section energy allocation for the individual completed section. For example, contingency response controller 732 may be configured to determine that the individual section expenditure for at least one half of individual completed sections exceeds the corresponding individual section energy allocations. Contingency response controller 732 may thus determine that, in traversing flight path 702, aerial vehicle 736 is using more energy than has been budgeted by energy allocation controller 708 for at least the threshold number of individual completed sections. Contingency response controller 732 may determine that, given than at least the threshold number of individual sections have consumed more energy than allocated therefor, the energy expenditure for flight path 702 as a whole is likely to exceed total energy allocation 710, and contingency response controller 732 may thus determine contingency response operation 734.

In some cases, contingency response controller 732 may be configured to determine, based on section energy expenditure 730, whether a projected total energy expenditure for flight path 702 exceeds total energy allocation 710. The projected total energy expenditure may represent an expected energy usage of aerial vehicle 736 for traversing the entirety of flight path 702 given actual energy usage by aerial vehicle 736 for completing one or more of flight path sections 704-706. Contingency response controller 732 may be configured to determine that the projected total energy expenditure exceeds total energy allocation 710 and, based thereon, determine contingency response operation 734. In some cases, contingency response controller 732 may be configured to determine that the projected total energy expenditure exceeds total energy allocation 710 by at least a threshold energy value and, based thereon, determine contingency response operation 734. The threshold energy value may provide an additional buffer to account for various inaccuracies in energy usage measurements and predictions.

As one example, contingency response controller 732 may be configured to determine the projected total energy expenditure based on the cumulative section energy expenditure for the completed cumulative portion of flight path 702. For example, the projected total energy expenditure may be determined by scaling the cumulative section energy expenditure according to a fraction of flight path 702 represented by the completed cumulative portion of flight path 702. The projected total energy expenditure may be expressed as $$E_{PT} = E_{CCSE} * \left(\frac{E_T}{E_{CCS}}\right),$$

where $E_{CCSE}$ represents the cumulative section energy expenditure, Er represents total energy allocation 710, and $E_{CCS}$ represent the section energy allocation for the completed cumulative portion of flight path 702. $E_{CCS}$ may represent a sum of two or more of section energy allocations 716-718 corresponding to the completed cumulative portion of flight path 702. Thus, contingency response operation 734 may be determined when the energy usage by aerial vehicle 736 along the entirety of the completed portion of flight path 702 indicates that aerial vehicle 736 is likely to exceed total energy allocation 710.

As another example, contingency response controller 732 may be configured to determine the projected total energy expenditure based on the individual section energy expenditure for at least one completed individual section of flight path sections 704-706. For example, when flight path section 704 has been traversed by aerial vehicle 736, the projected total energy expenditure may be determined by scaling the individual section energy expenditure of flight path section 704 according to a fraction of flight path 702 represented by flight path section 704. The projected total energy expenditure may be expressed as $$E_{PT} = E_{CISE} * \left(\frac{E_T}{E_{CIS}}\right),$$

where $E_{CISE}$ represents the individual section energy expenditure for flight path section 704, $E_T$ represents total energy allocation 710, and $E_{CIS}$ represent section energy allocation 716 for flight path section 704. Thus, contingency response operation 734 may be determined when the energy usage by aerial vehicle 736 along any one or more individual sections of the completed portion of flight path 702 indicates that aerial vehicle 736 is likely to exceed total energy allocation 710.

Contingency response operation 734 may be determined based on an energy shortfall predicted for flight path 702. The energy shortfall may be based on a difference between (i) section energy expenditure 730 and/or other quantities determined based thereon and (ii) total energy allocation 710 and/or one or more aspects thereof. For example, the difference may be determined by subtracting total energy allocation 710 from the projected total energy expenditure, and may thus represent an amount of energy that aerial vehicle 736 is likely to use beyond what it has available for completing flight path 702 without modification. Thus, contingency response operation 734 may represent a modification to flight path 702 that is planned and/or expected to save (e.g., avoid using) and/or replenish (e.g., recharge the battery of aerial vehicle 736 by) at least the energy shortfall.

In some cases, contingency response operation 734 may involve modifying a subsequent section of flight path 702 to reduce a section energy allocation thereof. The subsequent section may represent part of flight path 702 that has not yet been traversed by aerial vehicle 736, and may follow a portion of flight path 702 that has already been traversed by aerial vehicle 736. Example modifications to flight path 702 are illustrated in and discussed in connection with FIGS. 8A, 8B, 8C, and 8D.

Figure 8A:
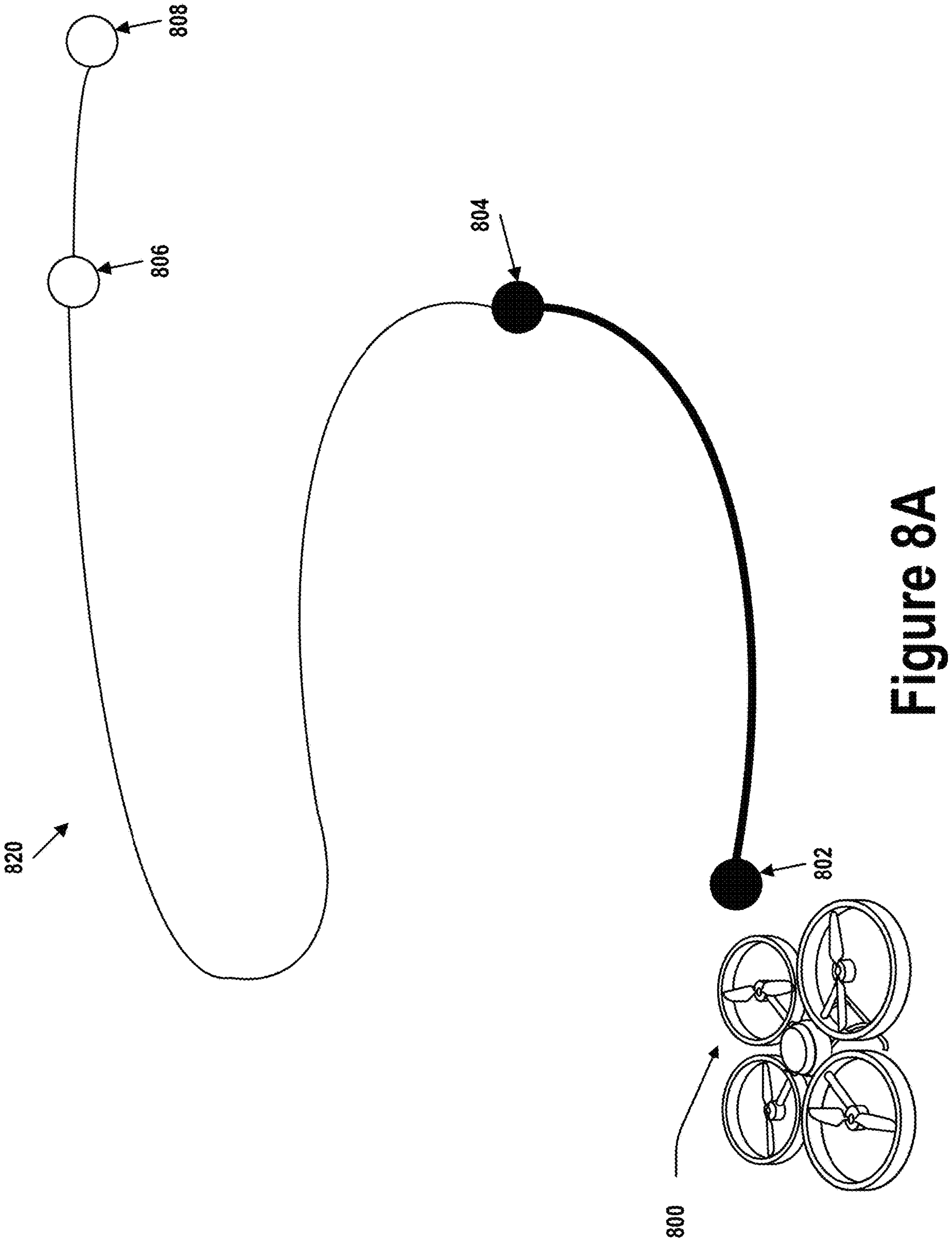
FIGS. 8A, 8B, 8C, and 8D illustrate example flight paths, in accordance with examples described herein.

Specifically, FIG. 8A illustrates flight path 820, which provides one example of flight path 702. Flight path 820 may include starting location 802, intermediate location 804, intermediate location 806, and destination location 808. Flight path 820 may be determined for traversal by aerial vehicle 800, which provides an example of aerial vehicle 736. Starting location 802 and intermediate location 804 are represented using black-filled circles and the flight path section therebetween is represented using a heavy line weight to indicate that aerial vehicle 800 has already completed this part of flight path 820. Intermediate location 806 and destination location 808 are represented using white-filled circles and the flight path sections from intermediate location 804 to destination location 808 are represented using a light line weight to indicate that aerial vehicle 800 has not yet completed this part of flight path 820.

Figure 8B:
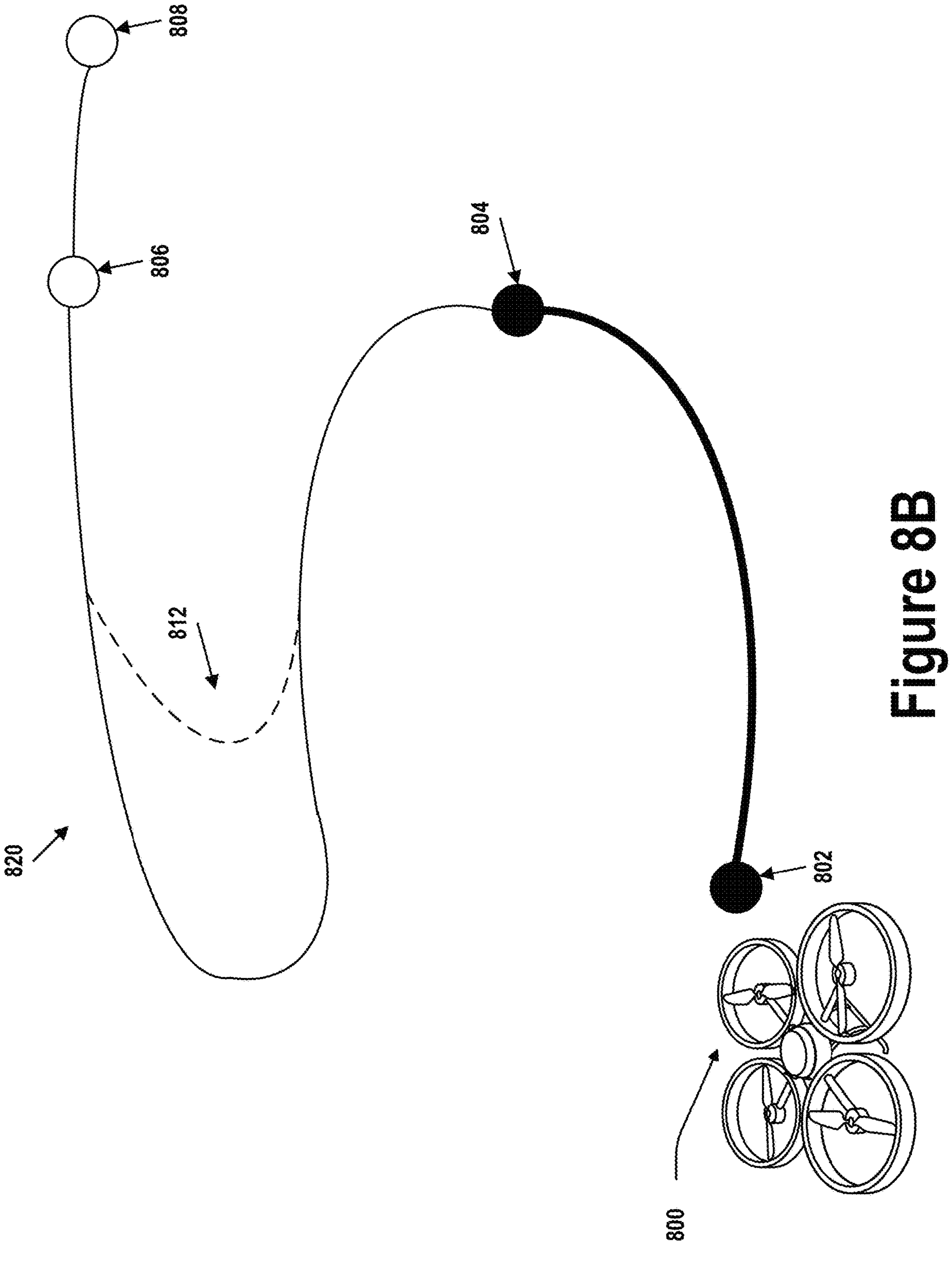

FIG. 8B illustrates flight path 820 modified by replacing part of the original flight path section between intermediate locations 804 and 806 with contingency section 812 that shortens the original flight path section. Thus, contingency response operation 734 may reduce the section energy allocation of the flight path section between intermediate locations 804 and 806 by shortening this flight path section. In some cases, contingency section 812 may reduce the section energy allocation possibly at the expense of traversing less favorable airspace (e.g., more congested airspace, airspace over an environment with fewer detectable visual features) than the original flight path section.

Figure 8C:
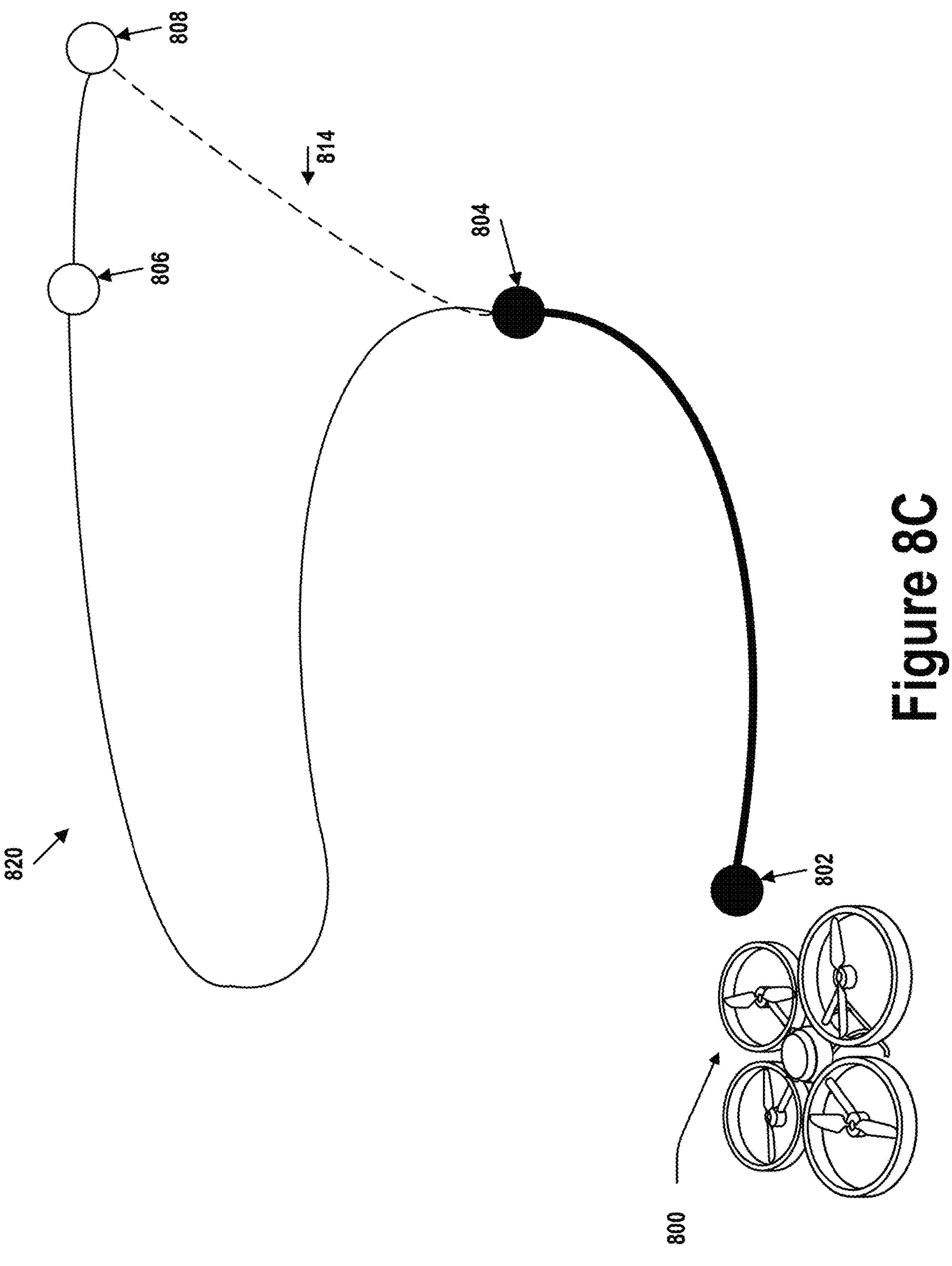

FIG. 8C illustrates flight path 820 modified by replacing part of the original flight path section between intermediate location 804 and destination location 808 with contingency section 814 that skips intermediate location 806. Thus, contingency response operation 734 may reduce the section energy allocation of the flight path sections between intermediate locations 804 and destination location 808 by removing these flight path sections and replacing them with a shorter contingency section 814 that connects intermediate location 804 directly to destination location 808.

Figure 8D:
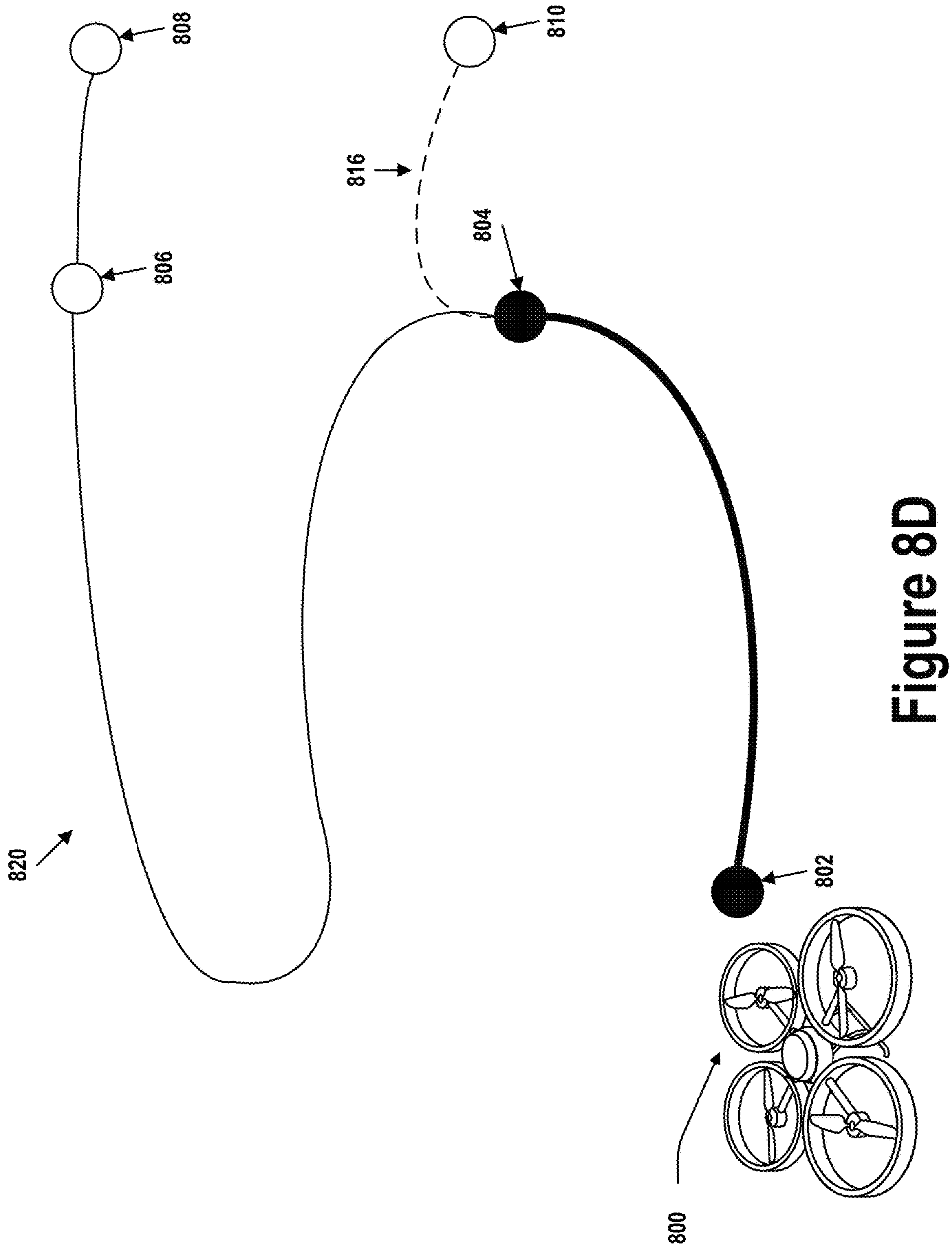

FIG. 8D illustrates flight path 820 modified by replacing part of the original flight path section between intermediate locations 804 and 806 and destination location 808 with contingency section 816, which causes aerial vehicle 800 to travel to contingency destination location 810 instead of destination location 808. Contingency destination location 810 may represent, for example, an emergency landing location. In some cases, contingency destination location 810 may include a battery charger that aerial vehicle 800 could use to charge its battery, thus potentially allowing aerial vehicle 800 to travel to intermediate location 806 and/or destination location 808 after recharging a battery of aerial vehicle 800 at contingency destination location 810. In other cases, aerial vehicle 800 may skip a delivery of a payload carried thereby (e.g., intended for destination location 808) as a result of being redirected to contingency destination location 810. Thus, contingency response operation 734 may reduce the section energy allocation of flight path 820 by removing from flight path 820 intermediate location 806, destination location 808, and the flight path sections therebetween, and adding a shorter contingency section 816 that connects intermediate location 804 to contingency destination location 810.

Reducing the section energy allocation of the subsequent section of flight path 702 may involve reducing one or more of the section baseline energy or the section energy margin of the subsequent section. For example, the subsequent section may be modified such that respective average values of attribute value(s) 432 are expected to produce a lower average energy usage, thereby reducing the section baseline energy of the subsequent section as modified. That is, the subsequent section as modified may, on average, favor lower energy consumption. As another example, the subsequent section may be modified such that respective standard deviations of attribute value(s) 432 are expected to produce a lower variation in energy usage, thus reducing the worst-case energy usage, and thereby reducing the section energy margin of the subsequent section as modified. That is, the subsequent section as modified may allow for more accurate predictions of energy usage, thus allowing lower energy margins to be provided to account for deviations from the predicted baseline energy usage.

In some cases, causing aerial vehicle 736 to perform contingency response operation 734 may involve reallocating energy from one or more section of flight path 702 to one or more contingency sections. In the example of FIG. 8C, contingency response operation 734 may involve a reallocation of section energy allocations from (i) the sections between locations 804, 806, and 808 to (ii) contingency section 814. In the example of FIG. 8D, contingency response operation 734 may involve a reallocation of section energy allocations from (i) the sections between locations 804, 806, and 808 to (ii) contingency section 816. Thus, the section energy allocation for the one or more contingency sections may depend at least in part on how much energy can be reallocated from sections of flight path 702 that will be skipped when performing contingency response operation 734.

In some cases, contingency response controller 732 may be configured to consider a wind direction along different parts of flight path 702. Thus, contingency response operation 734 may modify the subsequent section of flight path 702 by decreasing a distance along which aerial vehicle 736 is expected to fly against the wing, and/or increasing a distance along which aerial vehicle 736 is expected to fly perpendicular to and/or in the direction of the wind. Thus, rather than expending additional energy in working against the wind, aerial vehicle 736 may instead be helped by, or at least not be hindered by, the wind when performing contingency response operation 734.

In some cases, contingency response operation 734 may modify the subsequent section of flight path 702 to reduce a change in altitude performed by aerial vehicle 736 along the subsequent section. For some aircraft, changes in altitude may be relatively more costly than other flight operations, especially when carrying a payload. Thus, reducing changes in altitude may offer greater energy savings than, for example, shortening a length of flight path 702. As an example, when aerial vehicle 736 is configured to pick-up and/or drop-off a payload, the change in altitude may be reduced by increasing an altitude from which aerial vehicle 736 performs the payload pick-up and/or the payload drop-off. By performing the pick-up and/or drop-off from a higher altitude, an amount of energy expended in connection with (i) descending the aerial vehicle in preparation for the payload pickup and/or drop-off operation and (ii) ascending the aerial vehicle following the payload pick-up and/or drop-off operation may be reduced.

When aerial vehicle 736 uses a tether (e.g., tether 224) to pick up payloads, the higher altitude from which pick-up and/or drop-off is performed may be accommodated by deploying a longer length of the tether to reach a payload on or near the ground from the higher altitude. Performing the payload pick-up and/or drop-off from the higher altitude may be associated with a decreased accuracy in the positioning of (i) a payload coupling apparatus (e.g., payload coupling apparatus 226) connected to the tether and/or (ii) the payload, which may be tolerated or compensated for in order to allow aerial vehicle 736 to reduce its energy usage.

In some cases, contingency response operation 734 may modify the subsequent section of flight path 702 by updating a first air speed of travel of the aerial vehicle 736 along the subsequent section to a second air speed of travel. Aerial vehicle 736 may be expected to use less energy per unit distance when traveling at the second air speed than when traveling at the first air speed. For example, the second air speed may be lower than the first air speed. Thus, speed of travel may be reduced (possibly delaying aspects of a mission associated with flight path 702) in order to reduce the section energy expenditure incurred in connection with the subsequent section of flight path 702 (possibly allowing for completion of aspects of the mission which might not otherwise be performable due to an energy shortage). In some cases, contingency response operation 734 may involve aerial vehicle 736 performing a loiter flight.

In some cases, execution of contingency response operation 734 may cause operations of other parts of UAV system 300 to be adjusted to accommodate contingency response operation 734. For example, some adjustments to flight path 702 may involve directing aerial vehicle 736 to move through congested airspace, which may depend on UAV system 300 rerouting other aerial vehicles to allow aerial vehicle 736 to be present in the congested airspace. As another example, some adjustments to flight path 702 may reduce the quality of sensor data available to aerial vehicle 736, thus potentially affecting the ability of aerial vehicle 736 to respond to certain types of failures. For example, flight path 702 as adjusted may be associated with image data that is of lower utility for visual inertial odometry (VIO) and/or semantic localization, among other possibilities. Thus, if a primary navigation system (e.g., a satellite-based navigation system) of aerial vehicle 736 experiences a failure, navigation using VIO and/or semantic localization may be more difficult along flight path 702 as modified than along original flight path 702. Because of such secondary considerations, some of flight path sections 704-706 might not always be energy-optimal (e.g., might not represent the shortest path between two consecutive waypoints) and, if needed, may be modified to sacrifice one or more secondary considerations in favor of decreased energy usage.

In some cases, aerial vehicle 736 may experience a problem condition. For example, a component of aerial vehicle 736 may fail or may operate in a degraded manner. In some cases, aerial vehicle 736 may exceed total energy allocation 710 at least in part due to the problem condition (e.g., a degraded motor may use more energy than planned). In other cases, aerial vehicle 736 may exceed total energy allocation 710 independently of the problem condition. Contingency response controller 732 may be configured to determine contingency response operation 734 based on the problem condition. In some cases, contingency response operation 734 may be selected to avoid using components affected/impacted by the problem condition. For example, the problem condition may include one or more problems with a cruise propulsion system (e.g., horizontal propulsion units 108) of aerial vehicle 736 that allows aerial vehicle 736 to efficiently move in horizontal directions. Thus, contingency response operations 734 may instead use a hoover propulsion system (e.g., vertical propulsion units 110) of aerial vehicle 736 to move aerial vehicle 736 along the subsequent section of flight path 702. For example, aerial vehicle 736 may use the hoover propulsion system to hoover to a contingency destination location in place of using the cruise propulsion system to cruise to the original destination location.

Contingency system 700 may be configured to track performance of a plurality of aerial vehicles in an aerial vehicle fleet, and may adjust total energy allocation 710 accordingly. When the plurality of aerial vehicles rarely experiences energy shortfalls, total energy margin 714 and/or section energy margins 724-726 may be decreased, thus allowing for planning and/or performance of longer and/or more complex flight paths. When the plurality of aerial vehicles frequently experiences energy shortfalls, total energy margin 714 and/or section energy margins 724-726 may be increased, thus reducing the likelihood of aerial vehicles experiencing energy shortfalls.

For example, based on and/or in response to contingency system determining that at least a threshold number of aerial vehicles in the fleet have performed respective contingency response operations, energy allocation controller 708 may be configured to increase a minimum energy margin allocated to future flight paths for aerial vehicles in the fleet. The threshold number of aerial vehicles may represent, for example, a fraction of the fleet (e.g., 5%, 10%, 20%, etc. of the vehicles in the fleet). The fraction of the fleet may be selected by operator(s) of UAV system 300 based on the performance that is tolerable and/or targeted by the operator(s) and/or users of UAV system 300, among other considerations. The minimum energy margin may be increased by increasing the predetermined fraction of the baseline energy represented by the energy margin, by updating the variance of attribute value(s) 432, and/or increasing the number of standard deviations of attribute value(s) on which the energy margin is based, among other possibilities.

In some cases, based on and/or in response to contingency response controller 732 determining that aerial vehicle 736 is likely to exceed total energy allocation 710 for flight path 702, one or more models of energy system 400 may be retrained. The models as retrained may then be used to determine the expected power and/or energy usage in connection with aerial vehicle 736 performing contingency response operation 734. Thus, for example, the determination that aerial vehicle 736 is likely to exceed total energy allocation 710 may cause a flight-specific model to be trained to more accurately account for factors that may have caused total energy allocation 710 to be inaccurate for flight path 702.

IX. Additional Example Operations

Figure 9:
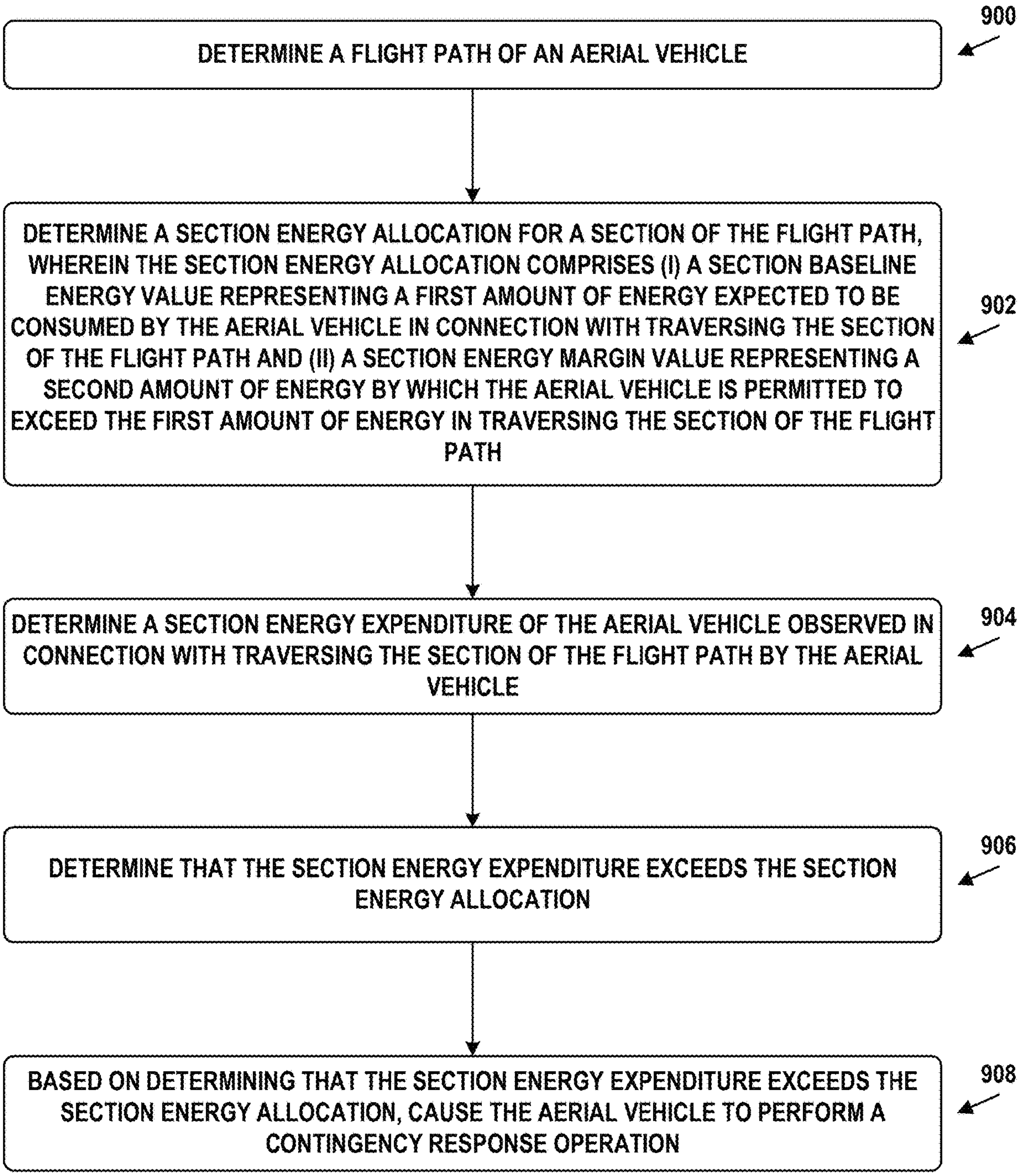
FIG. 9 is a flowchart, in accordance with examples described herein.

FIG. 9 illustrates a flow chart of operations related to determining and performing contingency response operations when an aerial vehicle is likely to experience an energy shortfall in connection with a flight path. The embodiments of FIG. 9 may be simplified by the removal of any one or more of the features shown therein. Further, these embodiments may be combined with features, aspects, and/or implementations of any of the previous figures or otherwise described herein.

Block 900 may involve determining a flight path of an aerial vehicle.

Block 902 may involve determining a section energy allocation for a section of the flight path. The section energy allocation may include (i) a section baseline energy value representing a first amount of energy expected to be consumed by the aerial vehicle in connection with traversing the section of the flight path and (ii) a section energy margin value representing a second amount of energy by which the aerial vehicle is permitted to exceed the first amount of energy in traversing the section of the flight path.

Block 904 may involve determining a section energy expenditure of the aerial vehicle observed in connection with traversing the section of the flight path by the aerial vehicle.

Block 906 may involve determining that the section energy expenditure exceeds the section energy allocation.

Block 908 may involve, based on determining that the section energy expenditure exceeds the section energy allocation, causing the aerial vehicle to perform a contingency response operation.

In some examples, determining the section energy allocation for the section may include determining a total energy allocation for the flight path and determining the section energy allocation based on the total energy allocation. The total energy allocation may include (i) a total baseline energy value representing a third amount of energy expected to be consumed by the aerial vehicle in connection with traversing the flight path and (ii) a total energy margin value representing a fourth amount of energy by which the aerial vehicle is permitted to exceed the third amount of energy in performing the flight path.

In some examples, the flight path may include a starting location, a destination location, and an intermediate location between the starting location and the destination location. The section may represent a subset of the flight path from the starting location to the intermediate location. Determining the section energy allocation based on the total energy allocation may include determining the section baseline energy value by scaling the total baseline energy value according to a fraction of the flight path represented by the section of the flight path, and determining the section energy margin value by scaling the total energy margin value according to the fraction of the flight path represented by the section of the flight path.

In some examples, determining that the section energy expenditure exceeds the section energy allocation may include determining, based on the section energy expenditure, a projected total energy expenditure for the flight path by scaling the section energy expenditure according to a fraction of the flight path represented by the section of the flight path, and determining that the projected total energy expenditure exceeds the total energy allocation.

In some examples, causing the aerial vehicle to perform the contingency response operation may include determining, based on a difference between the section energy expenditure and the section energy allocation, an energy shortfall, and determining the contingency response operation based on the energy shortfall.

In some examples, causing the aerial vehicle to perform the contingency response operation may include determining a wind direction of wind along a portion of the flight path, and modifying the flight path to increase a distance along which the aerial vehicle is expected to fly in the wind direction.

In some examples, the section energy allocation may be a first section energy allocation. Causing the aerial vehicle to perform the contingency response operation may include modifying a subsequent section of the flight path to reduce a second section energy allocation for the subsequent section. The subsequent section may follow the section of the flight path.

In some examples, the second section energy allocation may include (i) a second section baseline energy value representing a third amount of energy expected to be consumed by the aerial vehicle in connection with traversing the second section of the flight path and (ii) a second section energy margin value representing a fourth amount of energy by which the aerial vehicle is permitted to exceed the third amount of energy in traversing the second section of the flight path. Modifying the subsequent section may include modifying the subsequent section to reduce at least one of the second section baseline energy value or the second section energy margin value.

In some examples, modifying the subsequent section may include removing the subsequent section from the flight path.

In some examples, modifying the subsequent section may include reducing a change in altitude to be performed by the aerial vehicle along the subsequent section.

In some examples, the subsequent section may include a payload drop-off operation. Reducing the change in altitude may include increasing an altitude from which the aerial vehicle performs the payload drop-off operation to reduce an amount of energy expanded in connection with descending the aerial vehicle in preparation for the payload drop-off operation and ascending the aerial vehicle following the payload drop-off operation.

In some examples, the subsequent section may be initially assigned a first air speed of travel for the aerial vehicle. Modifying the subsequent section may include updating the first air speed of travel assigned to the subsequent section to a second air speed of travel. The aerial vehicle may be expected to use less energy per unit distance when traveling at the second air speed than at the first air speed.

In some examples, causing the aerial vehicle to perform the contingency response operation may include, based on the reduction of the second section energy allocation, increasing a third section energy allocation for a contingency section of the flight path. The contingency response operation may be performed along the contingency section.

In some examples, determining that the section energy expenditure exceeds the section energy allocation may include determining that the section energy expenditure exceeds the section energy allocation by at least a predetermined energy threshold value.

In some examples, a problem condition associated with the section energy expenditure exceeding the section energy allocation may be determined. The contingency response operation may be selected based on the problem condition. The selected contingency response operation might not utilize components of the aerial vehicle that are affected by the problem condition.

In some examples, the problem condition may include a problem with a cruise propulsion system of the aerial vehicle. The contingency response operation may include using a hoover propulsion system of the aerial vehicle to hoover the aerial vehicle to a contingency destination in place of using the cruise propulsion system.

In some examples, it may be determined that at least a threshold number of aerial vehicles in an aerial vehicle fleet have performed respective contingency response operations. The aerial vehicle fleet may include the aerial vehicle. Based on determining that at least the threshold number of aerial vehicles have performed the respective contingency response operations, a minimum energy margin allocated to future flights paths for aerial vehicles in the aerial vehicle fleet may be increased.

In some examples, causing the aerial vehicle to perform the contingency response operation may include: causing the aerial vehicle to land at an emergency landing location, causing the aerial vehicle to travel to a battery charger, causing the aerial vehicle to skip delivery of a payload carried by the aerial vehicle, and/or causing the aerial vehicle to perform a loiter flight.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

determining a flight path of an aerial vehicle;

determining a section energy allocation for a section of the flight path, wherein the section energy allocation comprises (i) a section baseline energy value representing a first amount of energy expected to be consumed by the aerial vehicle in connection with traversing the section of the flight path and (ii) a section energy margin value representing a second amount of energy by which the aerial vehicle is permitted to exceed the first amount of energy in traversing the section of the flight path;

determining a section energy expenditure of the aerial vehicle observed in connection with traversing the section of the flight path by the aerial vehicle;

determining that the section energy expenditure exceeds the section energy allocation; and based on determining that the section energy expenditure exceeds the section energy allocation, causing the aerial vehicle to perform a contingency response operation that comprises executing a physical flight operation by the aerial vehicle.

2. The computer-implemented method of claim 1, wherein determining the section energy allocation for the section comprises:

determining a total energy allocation for the flight path, wherein the total energy allocation comprises (i) a total baseline energy value representing a third amount of energy expected to be consumed by the aerial vehicle in connection with traversing the flight path and (ii) a total energy margin value representing a fourth amount of energy by which the aerial vehicle is permitted to exceed the third amount of energy in performing the flight path; and determining the section energy allocation based on the total energy allocation.

3. The computer-implemented method of claim 2, wherein the flight path comprises a starting location, a destination location, and an intermediate location between the starting location and the destination location, wherein the section represents a subset of the flight path from the starting location to the intermediate location, and wherein determining the section energy allocation based on the total energy allocation comprises:

determining the section baseline energy value by scaling the total baseline energy value according to a fraction of the flight path represented by the section of the flight path; and determining the section energy margin value by scaling the total energy margin value according to the fraction of the flight path represented by the section of the flight path.

4. The computer-implemented method of claim 2, wherein determining that the section energy expenditure exceeds the section energy allocation comprises:

determining, based on the section energy expenditure, a projected total energy expenditure for the flight path by scaling the section energy expenditure according to a fraction of the flight path represented by the section of the flight path; and determining that the projected total energy expenditure exceeds the total energy allocation.

5. The computer-implemented method of claim 1, wherein causing the aerial vehicle to perform the contingency response operation comprises:

determining, based on a difference between the section energy expenditure and the section energy allocation, an energy shortfall; and determining the contingency response operation based on the energy shortfall.

6. The computer-implemented method of claim 1, wherein causing the aerial vehicle to perform the contingency response operation comprises:

determining a wind direction of wind along a portion of the flight path; and modifying the flight path to increase a distance along which the aerial vehicle is expected to fly in the wind direction.

7. The computer-implemented method of claim 1, wherein the section energy allocation is a first section energy allocation, and wherein causing the aerial vehicle to perform the contingency response operation comprises:

modifying a subsequent section of the flight path to reduce a second section energy allocation for the subsequent section, wherein the subsequent section follows the section of the flight path.

8. The computer-implemented method of claim 7, wherein the second section energy allocation comprises (i) a second section baseline energy value representing a third amount of energy expected to be consumed by the aerial vehicle in connection with traversing the second section of the flight path and (ii) a second section energy margin value representing a fourth amount of energy by which the aerial vehicle is permitted to exceed the third amount of energy in traversing the second section of the flight path, and wherein modifying the subsequent section comprises:

modifying the subsequent section to reduce at least one of the second section baseline energy value or the second section energy margin value.

9. The computer-implemented method of claim 7, wherein modifying the subsequent section comprises:

removing the subsequent section from the flight path.

10. The computer-implemented method of claim 7, wherein modifying the subsequent section comprises:

reducing a change in altitude to be performed by the aerial vehicle along the subsequent section.

11. The computer-implemented method of claim 10, wherein the subsequent section comprises a payload drop-off operation, and wherein reducing the change in altitude comprises:

increasing an altitude from which the aerial vehicle performs the payload drop-off operation to reduce an amount of energy expended in connection with (i) descending the aerial vehicle in preparation for the payload drop-off operation and (ii) ascending the aerial vehicle following the payload drop-off operation.

12. The computer-implemented method of claim 7, wherein the subsequent section is initially assigned a first air speed of travel for the aerial vehicle, and wherein modifying the subsequent section comprises:

updating the first air speed of travel assigned to the subsequent section to a second air speed of travel, wherein the aerial vehicle is expected to use less energy per unit distance when traveling at the second air speed than at the first air speed.

13. The computer-implemented method of claim 7, wherein causing the aerial vehicle to perform the contingency response operation comprises:

based on the reduction of the second section energy allocation, increasing a third section energy allocation for a contingency section of the flight path, wherein the contingency response operation is performed along the contingency section.

14. The computer-implemented method of claim 1, wherein determining that the section energy expenditure exceeds the section energy allocation comprises:

determining that the section energy expenditure exceeds the section energy allocation by at least a predetermined energy threshold value.

15. The computer-implemented method of claim 1, further comprising:

determining a problem condition associated with the section energy expenditure exceeding the section energy allocation; and selecting the contingency response operation based on the problem condition, wherein the selected contingency response operation does not utilize components of the aerial vehicle that are affected by the problem condition.

16. The computer-implemented method of claim 15, wherein the problem condition comprises a problem with a cruise propulsion system of the aerial vehicle, and wherein the contingency response operation comprises using a hover propulsion system of the aerial vehicle to hover the aerial vehicle to a contingency destination in place of using the cruise propulsion system.

17. The computer-implemented method of claim 1, further comprising:

determining that at least a threshold number of aerial vehicles in an aerial vehicle fleet have performed respective contingency response operations, wherein the aerial vehicle fleet comprises the aerial vehicle; and based on determining that at least the threshold number of aerial vehicles have performed the respective contingency response operations, increasing a minimum energy margin allocated to future flight paths for aerial vehicles in the aerial vehicle fleet.

18. The computer-implemented method of claim 1, wherein causing the aerial vehicle to perform the contingency response operation comprises one or more of:

causing the aerial vehicle to land at an emergency landing location;

causing the aerial vehicle to travel to a battery charger;

causing the aerial vehicle to skip delivery of a payload carried by the aerial vehicle; or causing the aerial vehicle to perform a loiter flight.

19. A system comprising:

a processor; and a non-transitory computer-readable medium having stored thereon instructions that, when executed by the processor, cause the processor to perform operations comprising:

determining a flight path of an aerial vehicle;

determining a section energy allocation for a section of the flight path, wherein the section energy allocation comprises (i) a section baseline energy value representing a first amount of energy expected to be consumed by the aerial vehicle in connection with traversing the section of the flight path and (ii) a section energy margin value representing a second amount of energy by which the aerial vehicle is permitted to exceed the first amount of energy in traversing the section of the flight path;

determining a section energy expenditure of the aerial vehicle observed in connection with traversing the section of the flight path by the aerial vehicle;

determining that the section energy expenditure exceeds the section energy allocation; and based on determining that the section energy expenditure exceeds the section energy allocation, causing the aerial vehicle to perform a contingency response operation that comprises executing a physical flight operation by the aerial vehicle.

20. A non-transitory computer-readable medium having stored thereon instructions that, when executed by a computing system, cause the computing system to perform operations comprising:

determining a flight path of an aerial vehicle;

determining a section energy allocation for a section of the flight path, wherein the section energy allocation comprises (i) a section baseline energy value representing a first amount of energy expected to be consumed by the aerial vehicle in connection with traversing the section of the flight path and (ii) a section energy margin value representing a second amount of energy by which the aerial vehicle is permitted to exceed the first amount of energy in traversing the section of the flight path;

determining a section energy expenditure of the aerial vehicle observed in connection with traversing the section of the flight path by the aerial vehicle;

determining that the section energy expenditure exceeds the section energy allocation; and based on determining that the section energy expenditure exceeds the section energy allocation, causing the aerial vehicle to perform a contingency response operation that comprises executing a physical flight operation by the aerial vehicle.

* * * * *